ns010530243B2

United States Patent
Jimichi et al.

(10) Patent No.: US 10,530,243 B2
(45) Date of Patent: *Jan. 7, 2020

(54) POWER CONVERSION DEVICE WITH MALFUNCTION DETECTION

(71) Applicant: Mitsubishi Electric Corporation, Chiyoda-ku (JP)

(72) Inventors: Takushi Jimichi, Chiyoda-ku (JP); Nils Soltau, Aachen (DE); Murat Kaymak, Aachen (DE); Rik W. De Doncker, Aachen (DE)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/319,851

(22) PCT Filed: Jun. 22, 2017

(86) PCT No.: PCT/JP2017/022971
§ 371 (c)(1),
(2) Date: Jan. 23, 2019

(87) PCT Pub. No.: WO2018/051603
PCT Pub. Date: Mar. 22, 2018

(65) Prior Publication Data
US 2019/0238050 A1 Aug. 1, 2019

(30) Foreign Application Priority Data
Sep. 16, 2016 (JP) .................. 2016-181160

(51) Int. Cl.
*H02M 1/32* (2007.01)
*H02M 3/335* (2006.01)
*H02M 1/00* (2006.01)

(52) U.S. Cl.
CPC .......... *H02M 1/32* (2013.01); *H02M 3/33507* (2013.01); *H02M 3/33592* (2013.01);
(Continued)

(58) Field of Classification Search
CPC ..... H02M 2001/322; H02M 2001/325; H02M 2001/0077; H02M 3/33569; H02M 3/33507; H02M 3/33592; H02M 1/32
See application file for complete search history.

(56) References Cited

U.S. PATENT DOCUMENTS 5,027,264 A   6/1991  Dedoncker et al.
9,250,023 B2 * 2/2016  Manahan ................ F28D 15/00
(Continued)

FOREIGN PATENT DOCUMENTS

EP   2 148 417 A1   1/2010
EP   2 341 594 A1   7/2011
(Continued)

OTHER PUBLICATIONS

International Search Report dated Aug. 22, 2017 in PCT/JP2017/022971 filed Jun. 22, 2017.
(Continued)

*Primary Examiner* — Harry R Behm
(74) *Attorney, Agent, or Firm* — Oblon, McClelland, Maier & Neustadt, L.L.P.

(57) ABSTRACT

Each DC/DC converter includes a transformer, first and second switching circuits each formed of a plurality of legs having a plurality of semiconductor switching elements, and capacitors. When detecting a malfunction in semiconductor switching elements, a control circuit halts a normal operation mode and controls the first switching circuit by a protection mode for turning OFF all the semiconductor switching elements, and controls the second switching circuit by a bypass mode for bypassing the capacitor by turning
(Continued)

ON the semiconductor switching elements in a discharge leg and causing a short circuit between the secondary side terminals, after controlling the second switching circuit by a discharge mode for discharging the capacitor by turning ON the semiconductor switching element in a discharge leg.

20 Claims, 27 Drawing Sheets

(52) U.S. Cl.
CPC ............... *H02M 2001/0074* (2013.01); *H02M 2001/0077* (2013.01); *H02M 2001/322* (2013.01)

(56) References Cited

U.S. PATENT DOCUMENTS

| | | | |
|---|---|---|---|
| 2010/0118453 | A1 | 5/2010 | Dorn et al. |
| 2013/0343089 | A1 | 12/2013 | Gupta et al. |
| 2016/0261205 | A1* | 9/2016 | Kolar .................... H02M 5/458 |
| 2017/0012521 | A1* | 1/2017 | Jimichi ................. H02M 7/483 |

FOREIGN PATENT DOCUMENTS

| | | |
|---|---|---|
| JP | 2002-199711 A | 7/2002 |
| JP | 2005-94874 A | 4/2005 |
| JP | 2012-217319 A | 11/2012 |
| JP | 2015-527032 A | 9/2015 |
| WO | WO 2008/125494 A1 | 10/2008 |
| WO | WO 2014/004065 A1 | 1/2014 |
| WO | WO 2015/090428 A1 | 6/2015 |
| WO | WO-2015133365 A1 * 9/2015 ............ H02M 7/483 |

OTHER PUBLICATIONS

De Doncker, R. W. A. A., et al., "Three-Phase Soft-Switched High-Power-Density dc/dc Converter for High-Power Applications," IEEE Transactions on Industry Applications, vol. 27, No. 1, Jan./Feb. 1991, pp. 63-73.

Extended European Search Report dated Aug. 26, 2019 in Patent Application No. 17850509.5, 9 pages.

* cited by examiner

POWER CONVERSION DEVICE WITH MALFUNCTION DETECTION

TECHNICAL FIELD

The present invention relates to a power conversion device that converts DC power to DC power by using a plurality of insulation-type converters.

BACKGROUND ART

As a conventional power conversion device that converts DC power to DC power, a power conversion device has been proposed wherein two single-phase full-bridge circuits that include semiconductor switching elements and perform power conversion between DC power and AC power are used, and AC terminals of the respective single-phase full-bridge circuits are connected via a transformer. Accordingly, the primary side and the secondary side are insulated from each other, whereby a power conversion device capable of performing DC/DC conversion is implemented.

Alternatively, two three-phase bridge converters are used instead of the single-phase full-bridge circuits, and AC terminals of the respective three-phase bridge converters are connected via a three-phase transformer, whereby a power conversion device capable of performing DC/DC conversion is also implemented (see Patent Document 1, for example).

Further, as a conventional power conversion device using a plurality of insulation-type converters, a power conversion device including a plurality of power electronics modules which are substantially identical to one another has been proposed. Each of the power electronics modules includes a single-phase DC/AC inverter with an output side and an insulation type DC/DC converter with an input side. The insulation type DC/DC converters are continuously connected to the corresponding single-phase DC/AC inverters so as to share DC link capacitors. In the structure in which the plurality of power electronics modules are connected in series, any malfunctioning module is bypassed with use of a bypass switch so that the remaining modules are operated (see Patent Document 2, for example).

CITATION LIST

Patent Document

Patent Document 1: U.S. Pat. No. 5,027,264
Patent Document 2: Japanese Laid-Open Patent Publication No. 2015-527032

SUMMARY OF THE INVENTION

Problems to be Solved by the Invention

In the above power conversion device disclosed in Patent Document 2, since a malfunctioning module among the plurality of modules is bypassed with use of the bypass switch, the operation can be continued even when a malfunction has occurred. However, when DC/DC converters such as single-phase full-bridge converters or three-phase bridge converters as described in Patent Document 1 are used for the plurality of modules, a DC capacitor is short-circuited by the bypass switch and the bypass switch is damaged. Therefore, a malfunctioning DC/DC converter cannot be bypassed. This causes a problem that the operation cannot be continued.

The present invention has been made to solve the above problem, and an object of the present invention is to continue the operation of a power conversion device having a plurality of DC/DC converters, secondary side terminals of which are connected in series, without halting the operation even when a malfunction has occurred.

Solution to the Problems

A power conversion device according to the present invention includes a plurality of DC/DC converters, primary side terminals of which are connected in parallel and secondary side terminals of which are connected in series. The DC/DC converters each include: a transformer; a first switching circuit formed of a bridge circuit including a plurality of legs having a plurality of semiconductor switching elements to which antiparallel diodes are respectively connected, the first switching circuit being connected between the primary side terminals and a primary winding of the transformer so as to perform DC/AC power conversion; a second switching circuit formed of a bridge circuit including a plurality of legs having a plurality of semiconductor switching elements to which antiparallel diodes are respectively connected, the second switching circuit being connected between the secondary side terminals and a secondary winding of the transformer so as to perform DC/AC power conversion; a capacitor connected in parallel to the secondary side terminals; and a control circuit for controlling the first switching circuit and the second switching circuit.

A gate drive circuit of at least one of the semiconductor switching elements in each of the legs of the first switching circuit and the second switching circuit, includes a malfunction detection unit for detecting a malfunction in the semiconductor switching element.

The control circuit is provided with a normal operation mode, a protection mode for turning OFF all the semiconductor switching elements in the first switching circuit, a discharge mode for discharging the capacitor by turning ON the semiconductor switching elements in a predetermined leg in the second switching circuit, and a bypass mode for bypassing the capacitor by causing a short circuit between the secondary side terminals.

In each of the DC/DC converters, when the malfunction detection unit detects the malfunction in the semiconductor switching elements, the control circuit halts the normal operation mode, controls the first switching circuit by the protection mode, and controls the second switching circuit by the discharge mode after controlling the second switching circuit by the bypass mode.

Effect of the Invention

According to the power conversion device of the present invention, in the DC/DC converter where a malfunction has been detected, a short circuit is caused between the secondary side terminals after the capacitor connected in parallel to the secondary side terminals is discharged. Therefore, the malfunctioning DC/DC converter can be reliably bypassed, whereby power conversion can be reliably continued even when a malfunction has occurred.

DESCRIPTION OF EMBODIMENTS

First Embodiment

Hereinafter, the first embodiment of the present invention is described.

Figure 1:
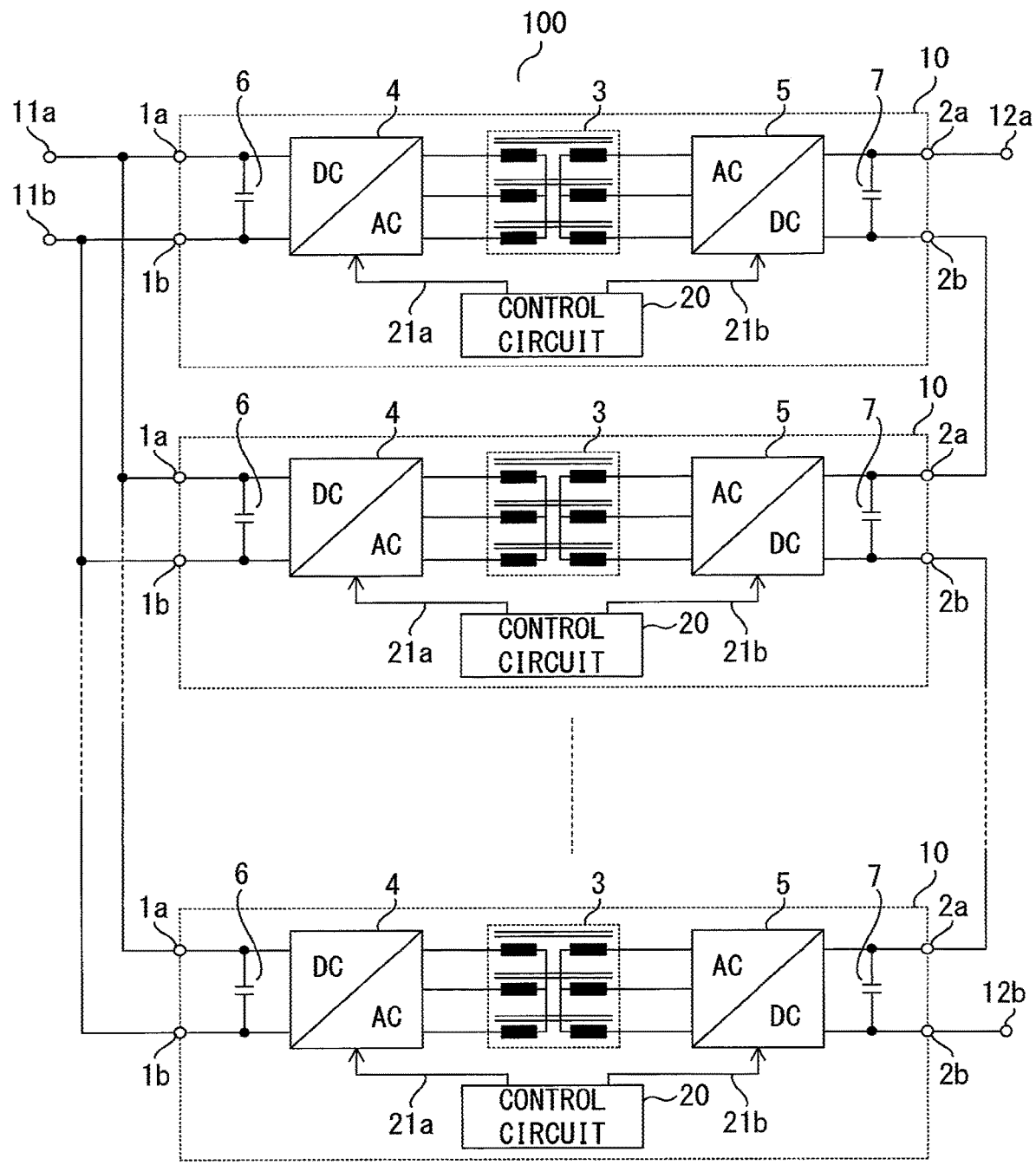
FIG. 1 is a schematic configuration diagram of a power conversion device according to the first embodiment of the present invention.

FIG. 1 is a diagram showing the schematic configuration of a power conversion device according to the first embodiment of the present invention. As shown in FIG. 1, the power conversion device 100 includes, as DC/DC converters, a plurality of submodules 10 between primary side DC terminals 11a, 11b and secondary side DC terminals 12a, 12b. The plurality of submodules 10 are connected to the primary side DC terminals 11a, 11b with primary side terminals 1a, 1b connected in parallel thereto, and secondary side terminals 2a, 2b are connected in series between the secondary side DC terminals 12a, 12b.

Since the submodules 10 are connected in parallel at the primary side, as described above, the power conversion device 100 can handle large-current power. Since the submodules 10 are connected in series at the secondary side, the power conversion device 100 can handle high-voltage power. Further, low-voltage DC power can be converted to high-voltage DC power.

It is noted that the number of the submodules 10 only needs to be two or more.

Each of the submodules 10 includes: a three-phase transformer 3 (hereinafter, simply referred to as transformer); a first switching circuit 4 that is connected between the transformer 3 and the primary side terminals 1a, 1b and that performs DC/AC power conversion; a second switching circuit 5 that is connected between the transformer 3 and the secondary side terminals 2a, 2b and that performs DC/AC power conversion; a capacitor 6 that is connected in parallel to the primary side terminals 1a, 1b; and a capacitor 7 that is connected in parallel to the secondary side terminals 2a, 2b. Each of the submodules 10 further includes a control circuit 20. The control circuit 20 generates drive signals 21a, 21b to control the first switching circuit 4 and the second switching circuit 5.

The submodules 10 are thus configured to perform power conversion between the primary side and the secondary side. It is noted that the power transmission direction may be freely controlled.

In this case, the control circuits 20 of the respective submodules 10 are illustrated near the main circuit configurations of the corresponding submodules 10 in FIG. 1. However, the arrangement is not limited thereto. For example, the control circuits 20 for the plurality of submodules 10 may be collectively arranged.

Hereinafter, when the submodules 10 are illustrated, illustration of the control circuits 20 is omitted for convenience, unless otherwise required.

Figure 2:
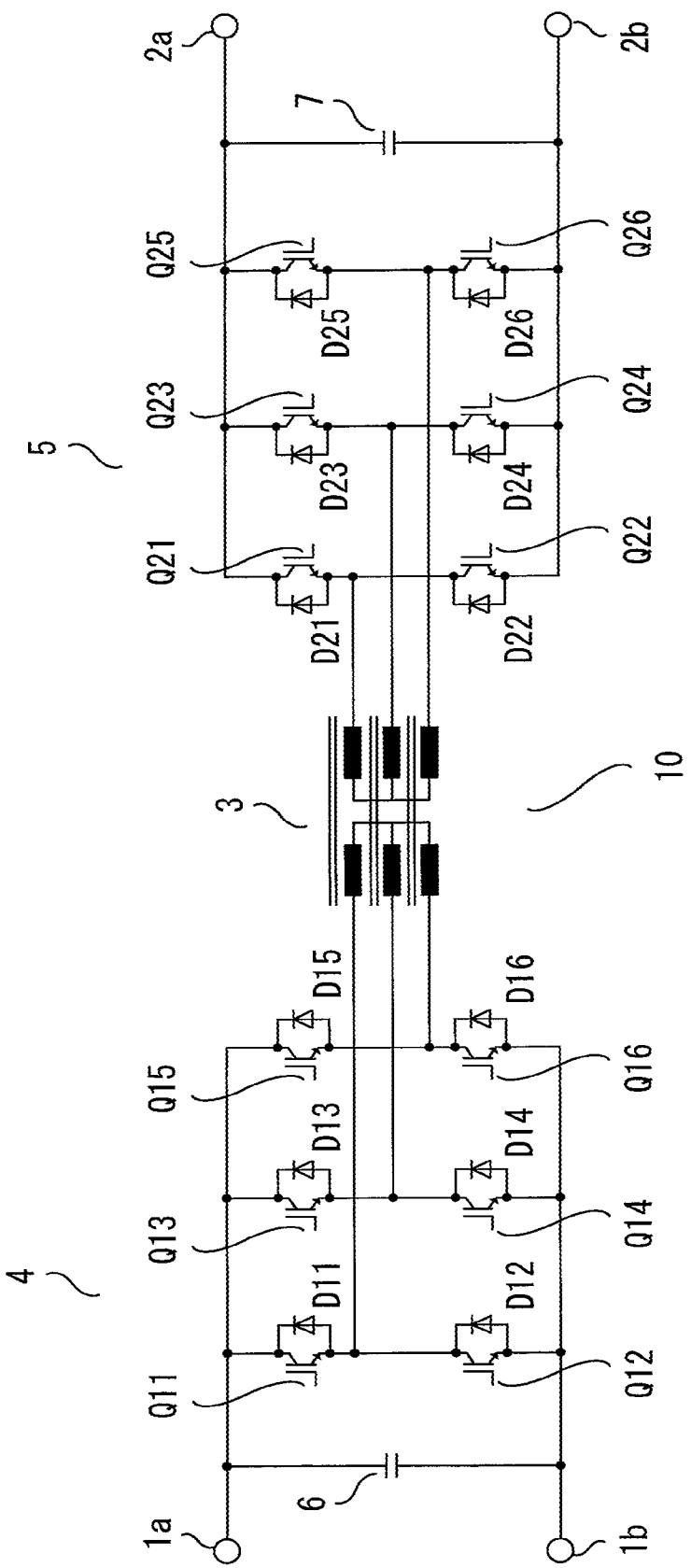
FIG. 2 is a circuit diagram showing the configuration example of a submodule according to the first embodiment of the present invention.

FIG. 2 is a circuit diagram showing the detailed configuration of a submodule 10.

The first switching circuit 4 is a three-phase bridge circuit including a plurality of semiconductor switching elements Q11 to Q16 (hereinafter, simply referred to as Q11 to Q16 or semiconductor switching elements Q1) to which diodes D11 to D16 are connected in antiparallel, respectively. Each phase thereof is formed of three legs (Q11, Q12), (Q13, Q14), (Q15, Q16) each obtained by connecting two semiconductor switching elements Q1 in series. Both ends (DC ends) of each of the legs are connected to the capacitor 6, and the intermediate point (AC end) of each of the legs is connected to a primary winding of the transformer 3.

The second switching circuit 5 is a three-phase bridge circuit including a plurality of semiconductor switching elements Q21 Q26 (hereinafter, simply referred to as Q21 to Q26 or semiconductor switching elements Q2) to which diodes D21 to D26 are connected in antiparallel, respectively. Each phase thereof is formed of three legs (Q21, Q22), (Q23, Q24), (Q25, Q26) each obtained by connecting two semiconductor switching elements Q2 in series. Both ends (DC terminals) of each of the legs are connected to the capacitor 7, and an intermediate point (AC terminal) of each of the legs is connected to a secondary winding of the transformer 3.

The transformer 3 has respective leakage inductances at the primary side and the secondary side. By using the leakage inductances, the first switching circuit 4 and the second switching circuit 5 each perform DC/AC power conversion.

It is noted that inductances for use in power conversion are not limited to the leakage inductances of the transformer 3, and additional inductance may be connected.

The ratio of number of turns of the transformer 3 preferably matches the ratio between the voltage of the capacitor 6, which is the primary side DC voltage, and the voltage of the capacitor 7, which is the secondary side DC voltage. For example, when the input voltage and the output voltage of the submodule 10 are 1 kV and 3 kV, respectively, the ratio of numbers of turns of the transformer 3 is set to 1:3.

Furthermore, self-arc-extinguishing type semiconductor switching elements such IGBTs (Insulated Gate Bipolar Transistors), GCTs (Gate Commutated Turn-off thyristors), or MOSFETs (Metal Oxide Semiconductor Field Effect Transistors) are used for the semiconductor switching elements Q1, Q2 in the first and second switching circuits 4, 5. It is noted that each of the semiconductor switching elements Q1, Q2 may be obtained by connecting a plurality of elements in parallel according to the current capacity.

Moreover, the semiconductor switching elements Q2 in the second switching circuit 5 are desirably configured to have an explosion proof structure. The explosion proof structure prevents, even when a semiconductor switching element Q2 has malfunctioned (for example, exploded), broken pieces scattered due to the malfunction from damaging the remaining semiconductor elements. Specifically, for example, each semiconductor module in the semiconductor switching elements Q2 is covered with a material, such as a metal or a resin, etc., having a high mechanical strength.

Also, electrolytic capacitors or film capacitors, etc. can be used for the capacitors 6, 7. Since high-frequency currents flow through the capacitors 6, 7, life prolongation can be achieved by use of film capacitors.

A gate drive circuit for driving a gate is provided to each of the semiconductor switching elements Q1, Q2.

Figure 3A:
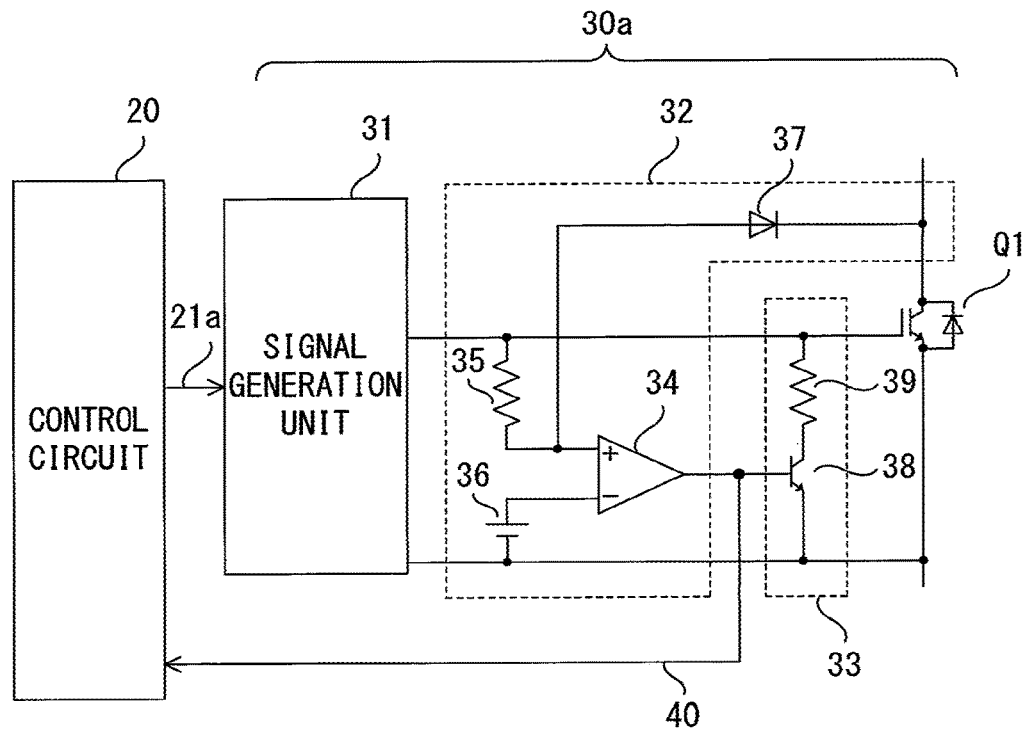
FIGS. 3A and 3B are circuit diagrams showing configuration examples of gate driving circuits according to the first embodiment of the present invention.
Figure 3B:
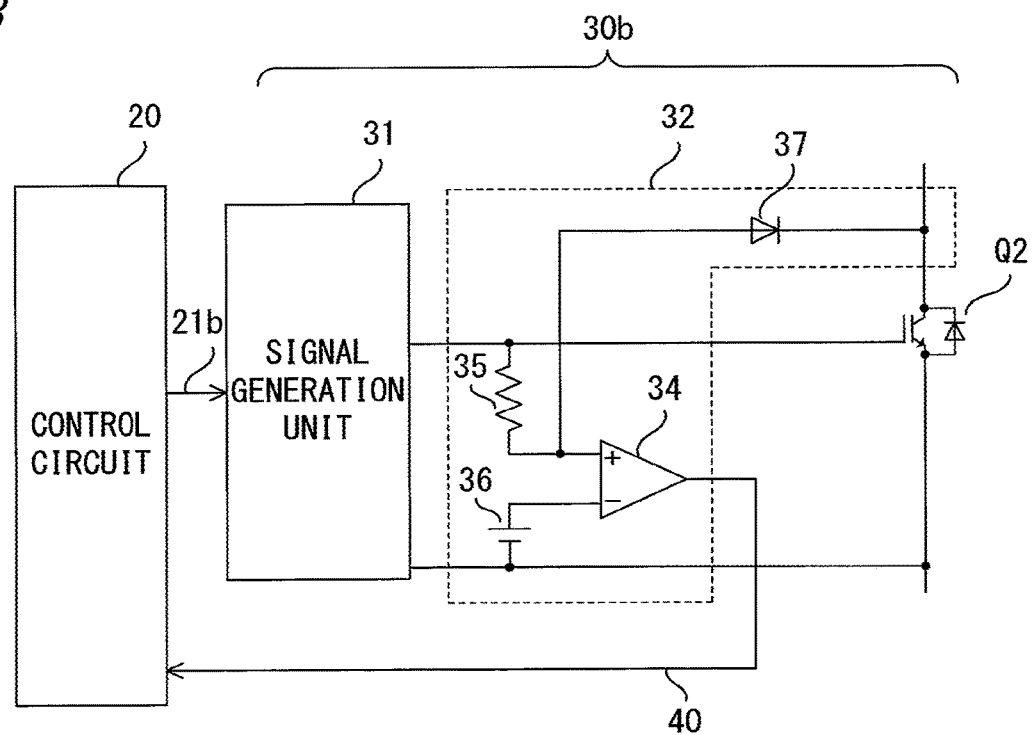
Figure 4:
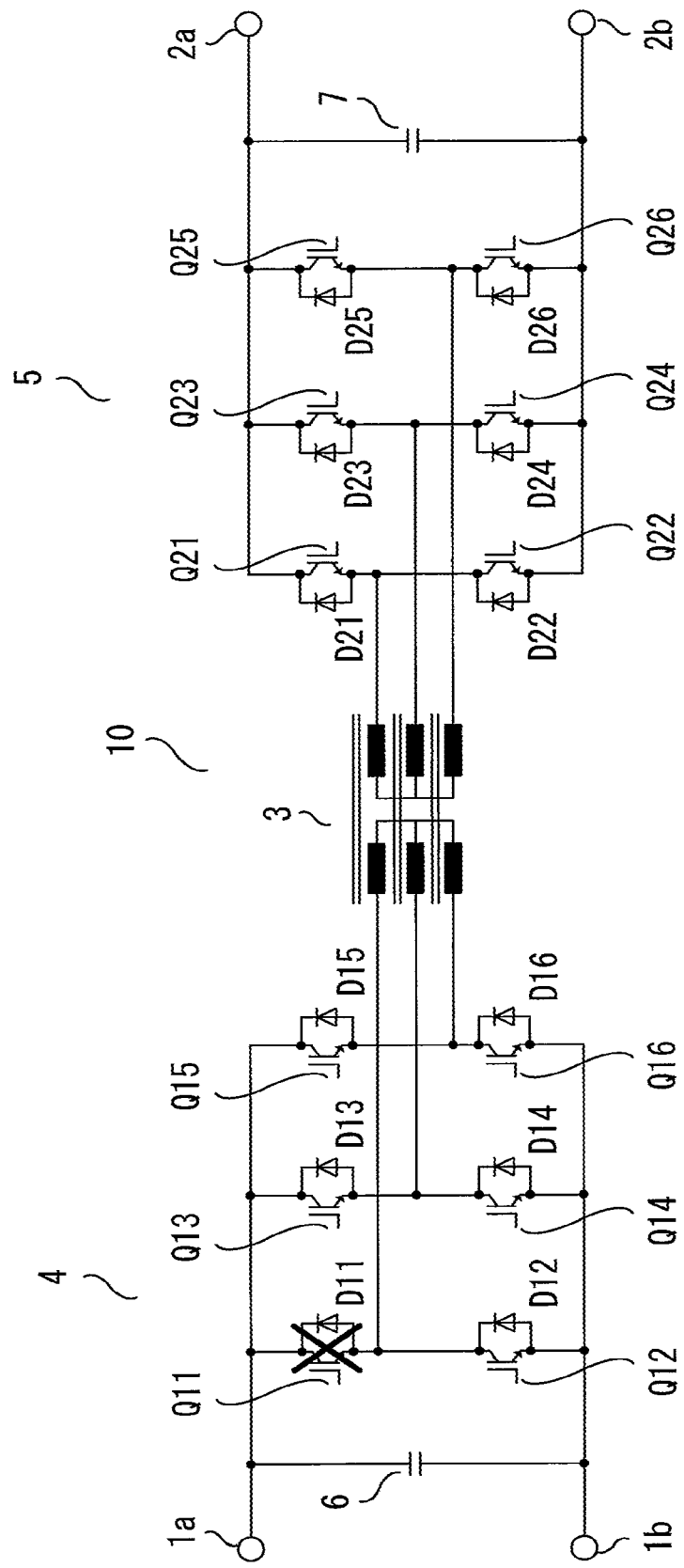
FIG. 4 is a circuit diagram illustrating a part of operation to be performed when a submodule has malfunctioned according to the first embodiment of the present invention.

FIGS. 3A and 3B show examples of the gate drive circuits of the semiconductor switching elements Q1 Q2 in the first and second switching circuits 4, 5. FIG. 3A shows a gate driving circuit 30a of each of the semiconductor switching elements Q1 in the first switching circuit 4, and FIG. 3B shows a gate driving circuit 30b of each of the semiconductor switching elements Q2 in the second switching circuit 5.

As shown in FIG. 3A, the gate driving circuit 30a of each of the semiconductor switching elements Q1 in the first switching circuit 4 includes: a signal generation unit 31 for generating a gate signal on the basis of the drive signal 21a from the control circuit 20; a malfunction detection unit 32 for detecting a malfunction in the semiconductor switching element Q1; and a blocking unit 33 for blocking the semiconductor switching element Q1 when the malfunction has been detected.

The malfunction detection unit 32 includes a comparator 34, a resistance 35, a reference voltage 36, and a diode 37, and detects a short-circuit current caused by a malfunction in the semiconductor switching element Q1. When an arm short circuit has occurred in a leg of the semiconductor switching element Q1 while the semiconductor switching element Q1 is in an ON state, the voltage of the capacitor 6 is applied to both ends of the semiconductor switching element Q1 so that the collector-emitter voltage is increased. It is noted that the drop voltage between the collector and the emitter is a few volts when no arm short circuit has occurred. The malfunction detection unit 32 detects the collector potential of the semiconductor switching element Q1 according to the potential of the connection point between the resistance 35 and the diode 37, and detects a short-circuit current by comparing, at the comparator 34, the collector potential with the reference voltage 36. A detection signal 40 which is an output from the comparator 34 is transmitted to the control circuit 20, and is inputted to the blocking unit 33.

The blocking unit 33 is formed of a series circuit including the switch 38 and the resistance 39. The detection signal 40 which is an output from the comparator 34 drives the switch 38. Namely, when the malfunction detection unit 32 detects a short-circuit current, the detection signal 40 turns ON the switch 38 of the blocking unit 33 so that the semiconductor switching element Q1 is blocked.

It is noted that the resistance 39 of the blocking unit 33 sets a resistance value to be larger, compared to a resistance (not illustrated) which is used to perform normal OFF control of the semiconductor switching element Q1. As a result, soft blocking of suppressing a surge voltage, which is generated at the time of blocking, can be performed.

The malfunction detection unit 32 and the blocking unit 33 in the gate driving circuit 30a each have a function which is generally called "arm short-circuit protection".

When one of the semiconductor switching elements in one leg has malfunctioned, the conductive state of the malfunctioning semiconductor switching element is continued, and the capacitor is short-circuited at the time of turning ON of the other sound semiconductor switching element, whereby a large overcurrent is generated. When such an overcurrent continues for 10 μs, the sound semiconductor switching element also malfunctions and the conductive state thereof is continued. Thus, the capacitor is continuously short-circuited.

In the "arm short circuit protection", such an overcurrent is detected, and thereby, a malfunction in a semiconductor switching element is detected, and a sound semiconductor switching element is turned OFF before malfunctioning. Accordingly, the sound semiconductor switching element is protected from the overcurrent so that the short-circuited state of the capacitor is eliminated.

Also, as shown in FIG. 3B, the gate driving circuit 30b of each of the semiconductor switching elements Q2 in the second switching circuit 5 includes the signal generation unit 31 that generates a gate signal on the basis of the drive signal 21b from the control circuit 20, and the malfunction detection unit 32 that detects a malfunction in the semiconductor switching element Q2. The gate driving circuit 30b includes the signal generation unit 31, but does not include the blocking unit 33.

Next, the operation of a submodule 10 is described below.

The control circuit 20 in the submodule 10 generates the drive signals 21a, 21b and controls the ON/OFF of the semiconductor switching elements Q1, Q2 in the first and second switching circuits 4, 5 so that transmission power can be controlled. As control during a normal operation, known phase shift control is used, for example. Such a control method during a normal operation is disclosed in the non-patent document "R. W. A. A. De Doncker, D. M. Divan, and M. H. Kheraluwala, "A Three-phase Soft-Switched High-Power-Density dc/dc Converter for High-Power Applications" IEEE Transactions on Industry Applications, vol. 27, no. 1, January/February, 1991.", for example. Thus, a detailed explanation of the control method is omitted.

In the present embodiment, during an abnormal time when semiconductor switching elements included in some of the plurality of submodules 10 constituting the power conversion device 100 have malfunctioned, the operation is continued with use of the remaining sound submodules 10. Therefore, in each of the submodules 10, when the control circuit 20 detects a malfunction in the submodule 10, the control circuit 20 performs control to disconnect the input and output of the submodule 10 from the entire power conversion device 100 so as to be bypassed, as described in detail later.

In addition to the normal operation mode for performing the aforementioned control during a normal operation, the control circuit 20 is provided with, as control modes for an abnormal time when a malfunction has been detected, a protection mode for turning OFF all the semiconductor switching elements Q1 in the first switching circuit 4, a discharge mode for discharging the capacitor 7 by turning ON the semiconductor switching elements Q2 of a predetermined leg in the second switching circuit 5, and a bypass mode for causing a short circuit between the secondary side terminals 2a, 2b of a submodule 10 and bypassing the capacitor 7.

First, the operation desired when a malfunction in the semiconductor switching elements Q1, Q2 has been detected is described below.

The primary sides of the plurality of submodules 10 in the power conversion device 100 are connected in parallel. Therefore, when an arm short circuit due to the malfunction has occurred in a leg in any of the submodules 10, the primary side terminals 1a, 1b of the remaining sound submodules 10 may also be short-circuited. Namely, the terminal voltages at the primary side DC terminals 11a, 11b become zero, and thus, the operation cannot be continued.

For this reason, all the primary side legs of the submodule 10 including a malfunctioning semiconductor switching element Q1, Q2 are opened (turned off), whereby the input and output on the primary side are disconnected from the entire power conversion device 100. Namely, in the submodule 10 where a malfunction has been detected, the control circuit 20 turns OFF all the first semiconductor switching elements Q1 of the first switching circuit 4 by the protection mode. It is noted that a current to a semiconductor switching element Q1 which cannot be turned OFF due to the malfunction and continues the ON state, is cut off by turning OFF of the other semiconductor switching elements Q1.

Furthermore, the secondary sides of the plurality of submodules 10 in the power conversion device 100 are connected in series. Since the voltage of the secondary side capacitor 7 of a malfunctioning submodule 10 cannot be controlled, the operation cannot be continued with use of the remaining submodules 10 in the state where the secondary side terminals 2a, 2b of the malfunctioning submodule 10 are connected in series.

For this reason, a short circuit between the secondary side terminals 2a, 2b of the malfunctioning submodule 10 is caused and the capacitor 7 is bypassed, whereby the secondary side input and output are disconnected from the entire power conversion device 100. However, as described below, the capacitor 7 is discharged before the capacitor 7 is bypassed.

In the submodule 10 including the malfunctioning semiconductor switching element Q1, Q2, the control circuit 20 controls the second switching circuit 5 of the submodule 10 by the discharge mode prior to bypassing of the capacitor 7. Namely, the semiconductor switching elements Q2 of a predetermined leg (hereinafter, referred to as discharge leg) in the second switching circuit 5 is turned ON so that the capacitor 7 is discharged via the discharge leg. The semiconductor switching elements Q2 of both arms in the discharge leg are forcibly turned ON, and thus, the capacitor 7 is short-circuited and discharged. The semiconductor switching elements Q2 other than those of the discharge leg are maintained in the OFF states.

At this time, all the energy stored in the capacitor 7 flows into the semiconductor switching elements Q2 of the discharge leg. Thus, the semiconductor switching elements Q2 may explode. As described above, an explosion proof structure is adopted for each of the semiconductor switching elements Q2 in the second switching circuit 5, whereby any damage to other elements and components can be prevented.

It is noted that a sound leg including no malfunctioning semiconductor switching element Q2 is used for the discharge leg, but malfunctions after being used for discharge.

After completion of discharge of the capacitor 7, the control circuit 20 controls the second switching circuit 5 of the submodule 10 by the bypass mode. Namely, the semiconductor switching elements Q2 of a leg (hereinafter, referred to as bypass leg) separate from the discharge leg in the second switching circuit 5 are turned ON and a short-circuit between the secondary side terminals 2a, 2b is caused via the bypass leg, so that the capacitor 7 is bypassed. The semiconductor switching elements Q2 of both arms in the bypass leg are forcibly turned ON, and thus, a short-circuit between the secondary side terminals 2a, 2b is caused. It is noted that a sound leg including no malfunctioning semiconductor switching element Q2 is used for the bypass leg. Since the discharge leg malfunctions after being used for discharge, the discharge is not used in the bypass mode.

In this case, in order to continue the power transmission operation of the entire power conversion device 100, it is necessary to continue the ON states of the semiconductor switching elements Q2 of both arms in the bypass leg. For this reason, a drive power source to be supplied to the gate drive circuit 30*b* of the semiconductor switching elements Q2 in the second switching circuit 5, is fed from another power source without using so-called self power feeding from the capacitor 7 being discharged.

For example, a drive power source for the second switching circuit 5 of the malfunctioning submodule 10 may be fed from the secondary side capacitor 7 of another proximate submodule 10. In this case, the potential of the gate drive circuit 30*b* of the second switching circuit 5 of the malfunctioning submodule 10 is close to the potential of the capacitor 7 of the other proximate submodule 10. Thus, the power source circuit can be implemented by low insulation.

Alternatively, a drive power source for the second switching circuit 5 of the malfunctioning submodule 10 may be fed from the primary side capacitor 6 of the same submodule 10. In this case, while the power source circuit needs insulation for the potential difference between the primary side and the secondary side, a voltage is constantly being applied to the primary side capacitor 6. Thus, the reliability can be enhanced.

Next, a series of operations to be performed when a malfunction has occurred in a semiconductor switching element included in a submodule 10 is described with reference to FIGS. 4 to 8. It is noted that a mark "X" on a semiconductor switching element in the drawings indicates that the semiconductor switching element has a malfunction.

Figure 5:
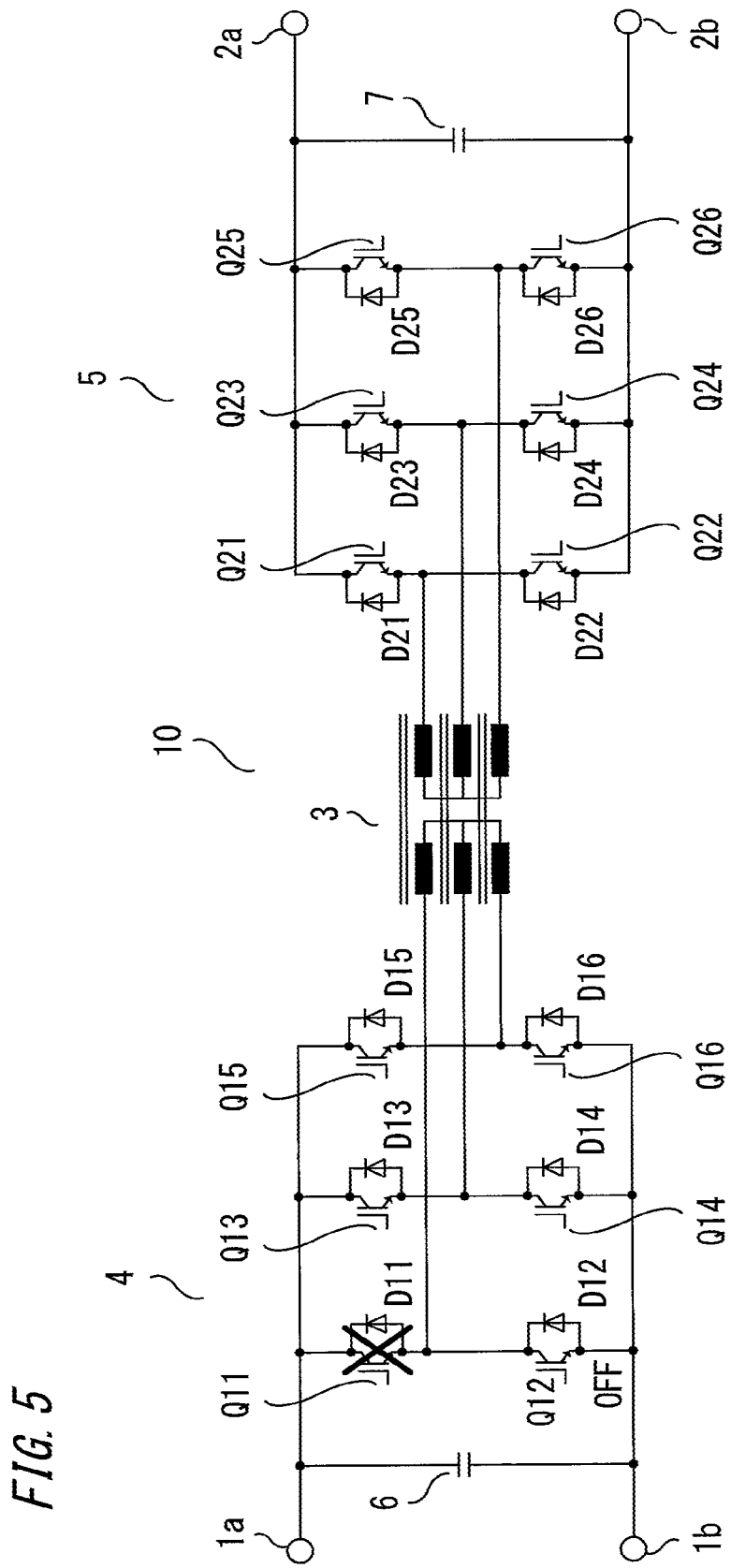
FIG. 5 is a circuit diagram illustrating a part of operation to be performed when a submodule has malfunctioned according to the first embodiment of the present invention.

When a malfunction has occurred in Q11 of the first switching circuit 4 during the operation of the submodule 10 in the normal operation mode (FIG. 4), the malfunction detection unit 32 of the gate driving circuit 30*a* of Q12 connected in series with Q11 detects a short-circuit current, transmits the detection signal 40 to the control circuit 20, and 012 is shifted to an OFF operation (soft blocking) (FIG. 5).

Figure 6:
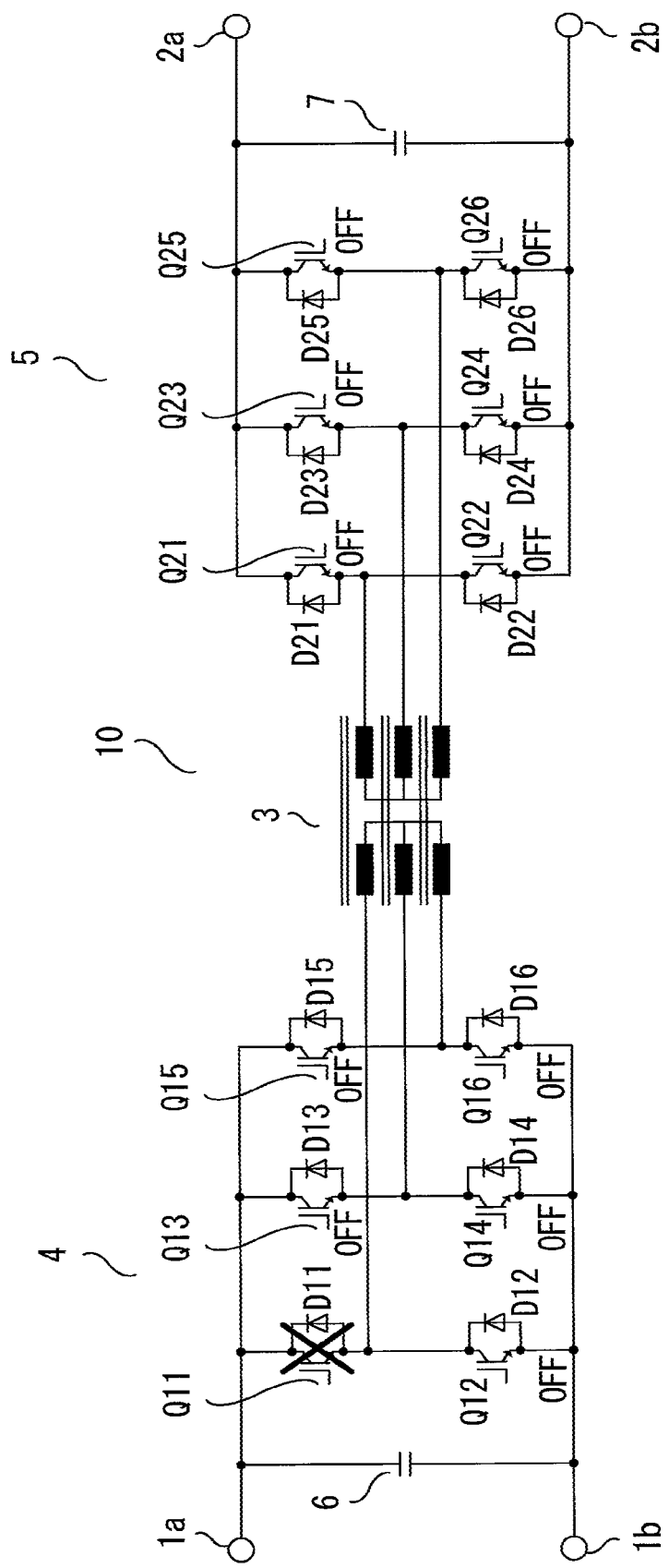
FIG. 6 is a circuit diagram illustrating a part of operation to be performed when a submodule has malfunctioned according to the first embodiment of the present invention.

The control circuit 20 receives the detection signal 40, determines that the submodule 10 has malfunctioned, controls all the semiconductor switching elements Q1, Q2 to the OFF states (FIG. 6). It is noted that, in this case, all the semiconductor switching elements Q1, Q2 on the primary side and the secondary side are controlled to the OFF states, but this control may be omitted.

Figure 7:
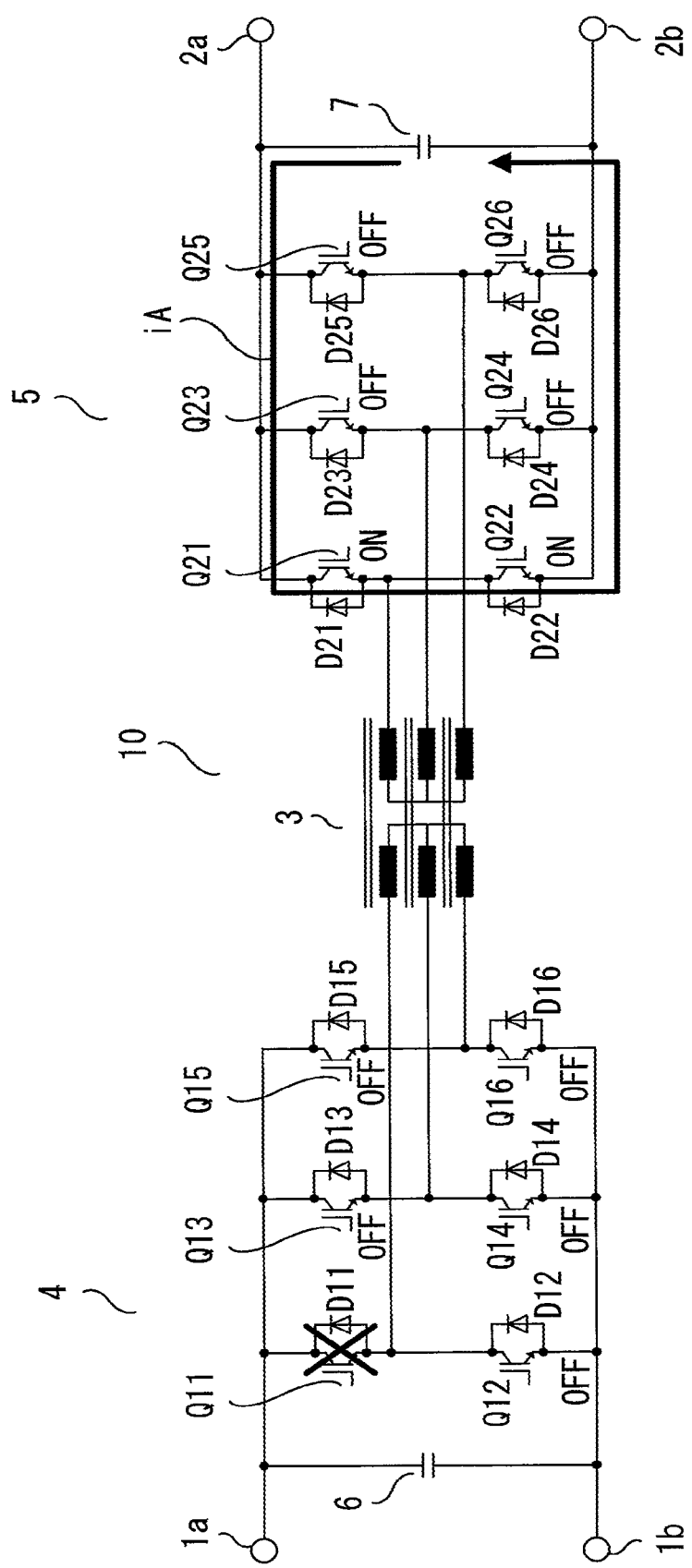
FIG. 7 is a circuit diagram illustrating a part of operation to be performed when a submodule has malfunctioned according to the first embodiment of the present invention.

Next, the control circuit 20 controls the first switching circuit 4 by the protection mode, that is, controls all the semiconductor switching elements Q1 to the OFF states, and controls the second switching circuit 5 by the discharge mode, that is, controls Q21, Q22 of the discharge leg (Q21, Q22) to the ON states and controls the other semiconductor elements Q2 to the OFF states. Accordingly, the capacitor 7 is discharged through a discharge route iA passing through the discharge leg (Q21, Q22) (FIG. 7). It is noted that any leg can be used for the discharge leg as long as the leg has no malfunction in the second switching circuit 5.

Figure 8:
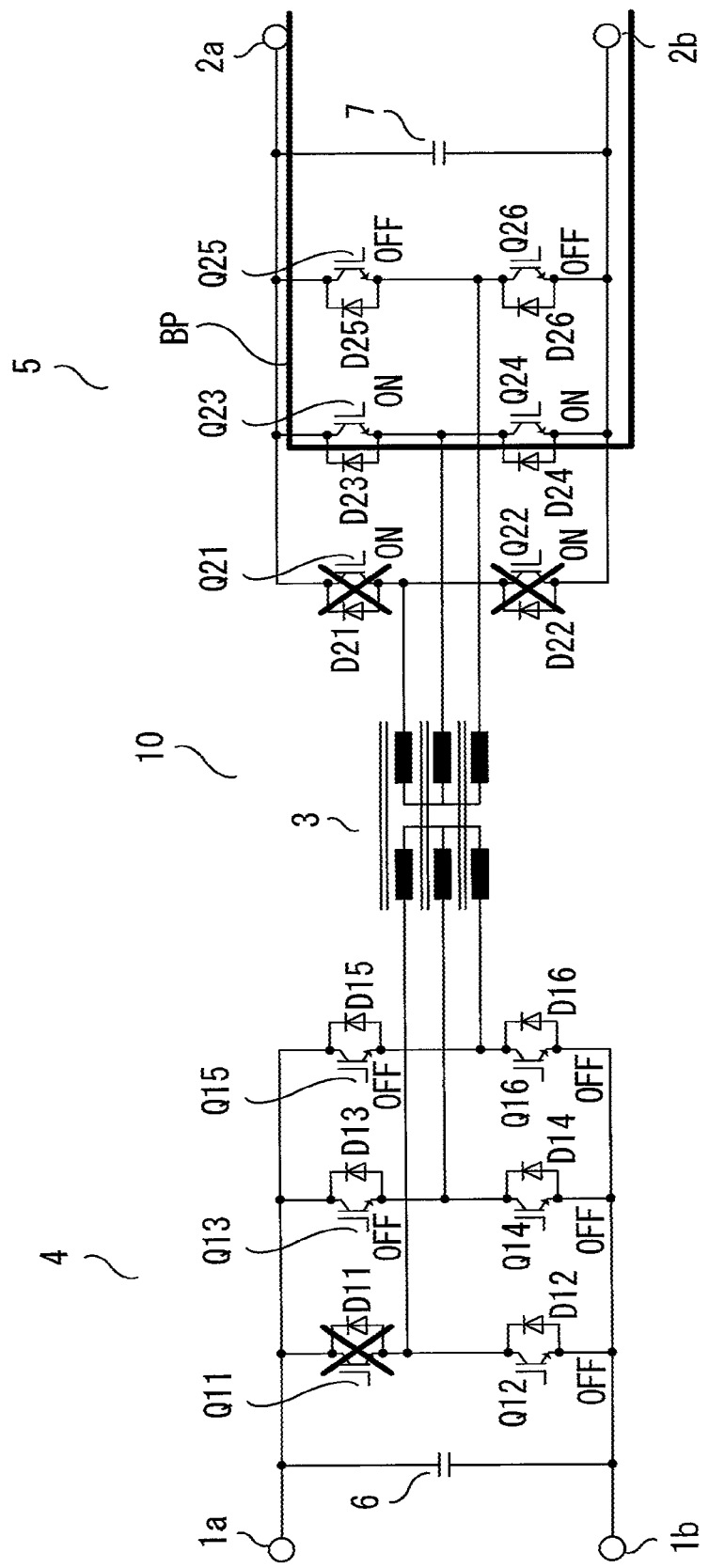
FIG. 8 is a circuit diagram illustrating a part of operation to be performed when a submodule has malfunctioned according to the first embodiment of the present invention.

When discharge of the capacitor 7 is completed, the control circuit 20 continues the protection mode in the first switching circuit 4, and shifts the mode to the bypass mode in the second switching circuit 5, that is, controls Q23, Q24 of the bypass leg (Q23, Q24) to the ON states. Accordingly, the secondary side terminals 2*a*, 2*b* are short-circuited through a bypass route BP passing through the bypass leg (Q23, Q24) so that the capacitor 7 is bypassed (FIG. 8). It is noted that a leg having no malfunction in the second switching circuit 5 is used for the bypass leg. Since the discharge leg malfunctions after being used for discharge, the discharge leg is not used for the bypass leg.

It is noted that when one of the submodules 10 malfunctions, the DC voltages at the secondary side terminals 2*a*, 2*b* thereof become zero so that power cannot be transmitted. For this reason, when the submodule 10 malfunctions, the remaining sound submodules 10 operate so as to compensate for the output voltage or transmission power of the malfunctioning submodule 10.

For example, when the total number of the submodules 10 is n and the total number of malfunctioning submodules 10 is m (m<n), the terminal voltages at the secondary side DC terminals 12*a*, 12*b* of the power conversion device 100 are (n−m)/n times of the terminal voltages which are obtained when no malfunction has occurred, and the transmission power of the power conversion device 100 is also (n−m)/n times of the transmission power obtained when no malfunction has occurred. Accordingly, when m submodules 10 have malfunctioned, respective voltage command values for the secondary side terminals 2*a*, 2*b* of the remaining (n−m) sound submodules 10 are controlled to be n/(n−m) times, or the respective power command values therefor are controlled to be n/(n−m) times. Consequently, the power conversion device 100 can continue a desired operation.

With reference to FIGS. 4 to 8, the case where a malfunction has occurred in the semiconductor switching element Q1 of the first switching circuit 4, has been described. However, a case where a malfunction has occurred in the semiconductor switching element Q2 of the second switching circuit 5, is different from the above case in that the operation (see FIG. 5) of causing an OFF operation (soft blocking) of the semiconductor switching element Q2 connected in series to the malfunctioning semiconductor switching element Q2, is not involved.

Further, a sound leg is necessarily used for a bypass leg in this case. However, a leg including the malfunctioning semiconductor switching element Q2 may be used for the discharge leg. In most cases of malfunctions in a semiconductor switching element, the ON state thereof is continued. In this case, a leg including the malfunctioning semiconductor switching element Q2 may be used for the discharge leg.

As described above, in the present embodiment, when the malfunction detection unit 32 for the gate driving circuits 30*a*, 30*b* detects a malfunction in the semiconductor switching elements Q1, Q2 in the submodule 10, the control circuit 20 halts the normal operation mode, controls the first switching circuit 4 by the protection mode, and controls the second switching circuit 5 by the bypass mode after controlling the second switching circuit 5 by the discharge mode. Accordingly, control to reliably disconnect the input and output of the submodule 10 from the entire power conversion device 100 so as to bypass the submodule 10 can be performed, and thus, the operation of the power conversion device 100 can be continued with use of the remaining sound submodules 10.

It is noted that, when the gate drive circuit includes the malfunction detection unit 32 in at least one of the semiconductor switching elements Q1, Q2 of the legs of the first and second switching circuits 4, 5, a short-circuit current in the leg can be detected.

Further, in the above embodiment, the example of the malfunction detection unit 32 that detects short-circuit currents has been described. However, the malfunction detection unit 32 can also detect other malfunctions, such as a malfunction that the semiconductor switching elements Q1, Q2 are not turned ON irrespective of the input of an ON signal thereto, and the same effect can be provided.

Second Embodiment

Next, the second embodiment of the present invention is described.

In the above first embodiment, the submodules 10 having the first and second switching circuits 4, 5 each formed of a three-phase bridge circuit are used. In the second embodiment, single-phase full-bridge circuits are used for first and second switching circuits of submodules.

Figure 9:
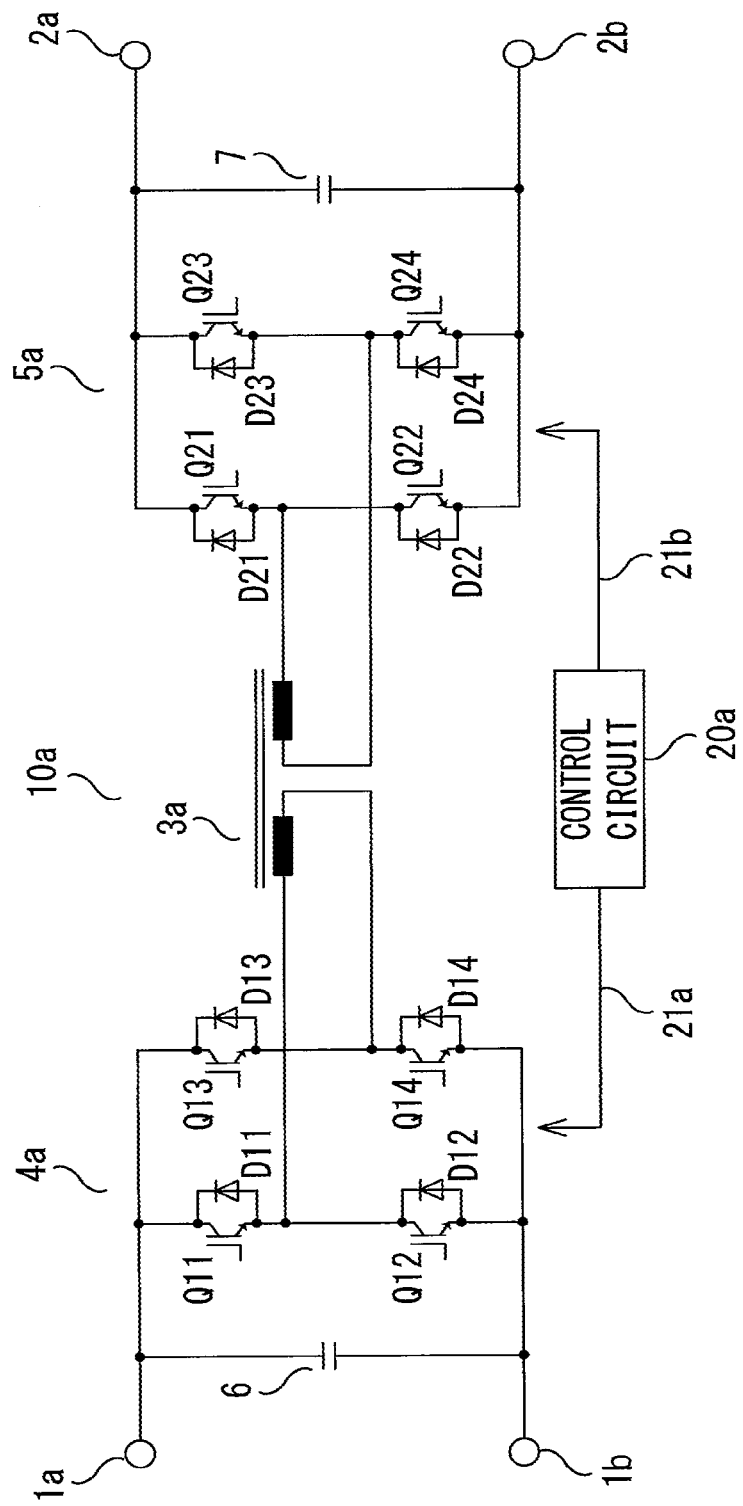
FIG. 9 is a circuit diagram showing the configuration of submodule according to the second embodiment of the present invention.
Figure 10:
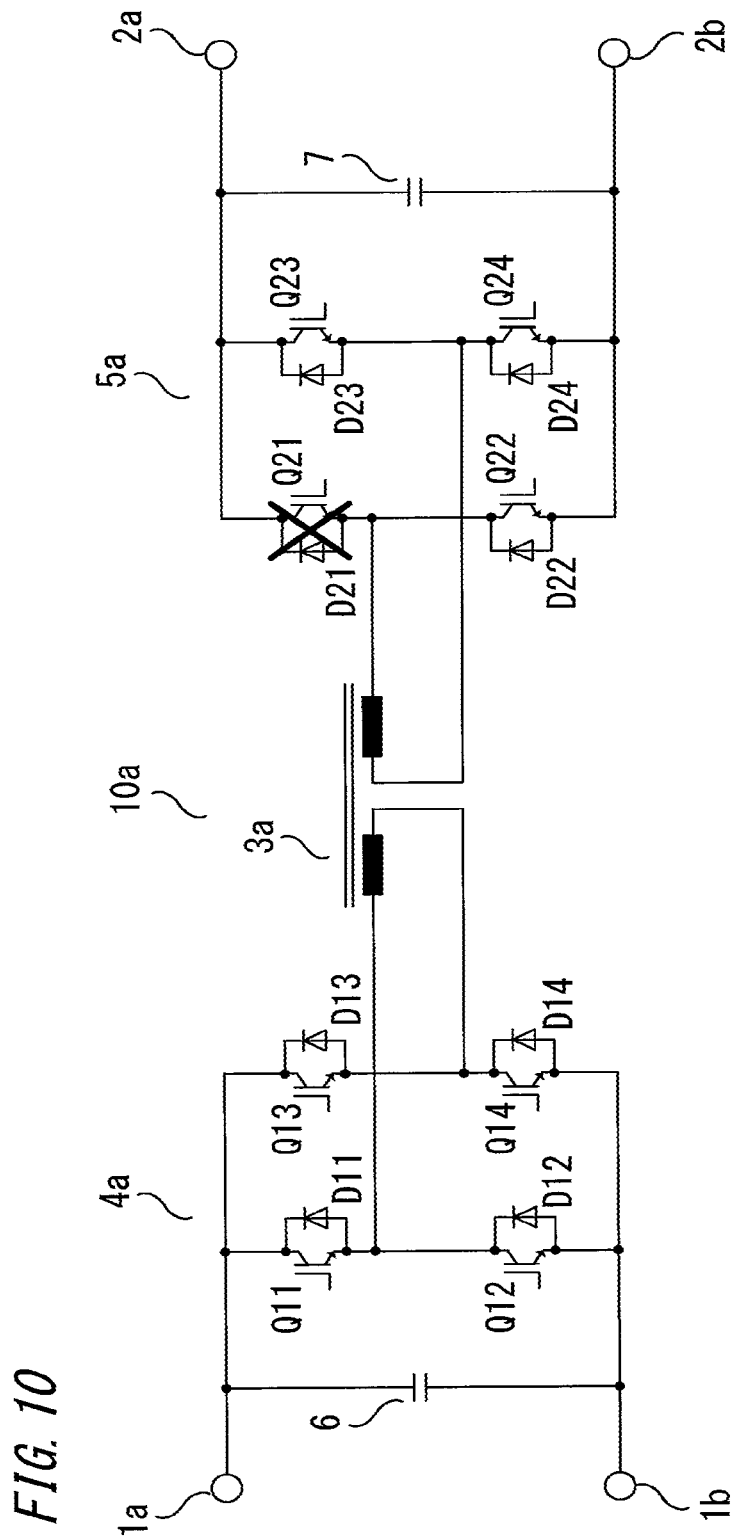
FIG. 10 is a circuit diagram illustrating a part of operation to be performed when a submodule has malfunctioned according to the second embodiment of the present invention.

FIG. 9 is a circuit diagram showing the detailed configuration of a submodule 10a in the power conversion device 100 according to the second embodiment.

Each submodule 10a includes: a single-phase transformer 3a; a first switching circuit 4a that is connected between the transformer 3a and the primary side terminals 1a, 1b and that performs DC/AC power conversion; a second switching circuit 5b that is connected between the transformer 3a and the secondary side terminals 2a, 2b and that performs DC/AC power conversion; the capacitor 6 connected in parallel to the primary side terminals 1a, 1b; and the capacitor 7 connected in parallel to the secondary side terminals 2a, 2b. Each submodule 10a further includes a control circuit 20a. The control circuit 20a generates the drive signals 21a, 21b to control the first switching circuit 4a and the second switching circuit 5a.

Hereinafter, when the submodule 10a is illustrated, illustration of the control circuit 20a is omitted for convenience, unless otherwise required.

The first switching circuit 4a is a single-phase full-bridge circuit having a plurality of semiconductor switching elements Q1 to Q14 (hereinafter, simply referred to as Q11 to Q14, or semiconductor switching elements Q1) connected in antiparallel to diodes D11 to D14, respectively, and is formed of two legs (Q11, Q12), (Q13, Q14) obtained by connecting two semiconductor switching elements Q1 in series for each phase. Both ends (DC ends) of each of the legs are connected to the capacitor 6, and the intermediate point (AC end) of each of the legs is connected to a primary winding of the transformer 3a. Further, the gate drive circuit 30a of each of the semiconductor switching elements Q1 has a configuration the same as that of the above first embodiment.

The second switching circuit 5a is a single-phase full-bridge circuit having a plurality of semiconductor switching elements Q21 to Q24 (hereinafter, simply referred to as Q21 to Q24, or semiconductor switching elements Q2) connected in antiparallel to diodes D21 to D24, respectively, and is formed of two legs (Q21, Q22), (Q23, Q24) each obtained by connecting two semiconductor switching elements Q2 in series for each phase. Both ends (DC ends) of each of the legs are connected to the capacitor 7, and the intermediate point (AC end) of each of the legs is connected to a secondary winding of the transformer 3a. In addition, the gate driving circuit 30b of each of the semiconductor switching elements Q2 has a configuration the same as that of the above first embodiment.

The other components are the same as those of the above first embodiment.

Also in this case, by using the leakage inductances of the transformer 3a, the first switching circuit 4a and the second switching circuit 5a each perform DC/AC power conversion, and the submodule 10a performs power conversion between the primary side and the secondary side. It is noted that the power transmission direction may be freely controlled. Moreover, each of the semiconductor switching elements Q2 in the second switching circuit 5 is desirably formed with use of an explosion proof structure.

In addition to the normal operation mode, the control circuit 20a is provided with, as control modes for an abnormal time when a malfunction has been detected, a protection mode for turning OFF all the semiconductor switching elements Q1 in the first switching circuit 4a, a discharge mode for discharging the capacitor 7 by turning ON the semiconductor switching elements Q2 of a predetermined leg in the second switching circuit 5a, and a bypass mode for causing a short circuit between the secondary side terminals 2a, 2b of the bypass leg in the second switching circuit 5a so as to bypass the capacitor 7.

A series of the operation to be performed when a malfunction has occurred in the semiconductor switching elements Q2 included in the submodule 10a is described with reference to FIGS. 10 to 13.

Figure 11:
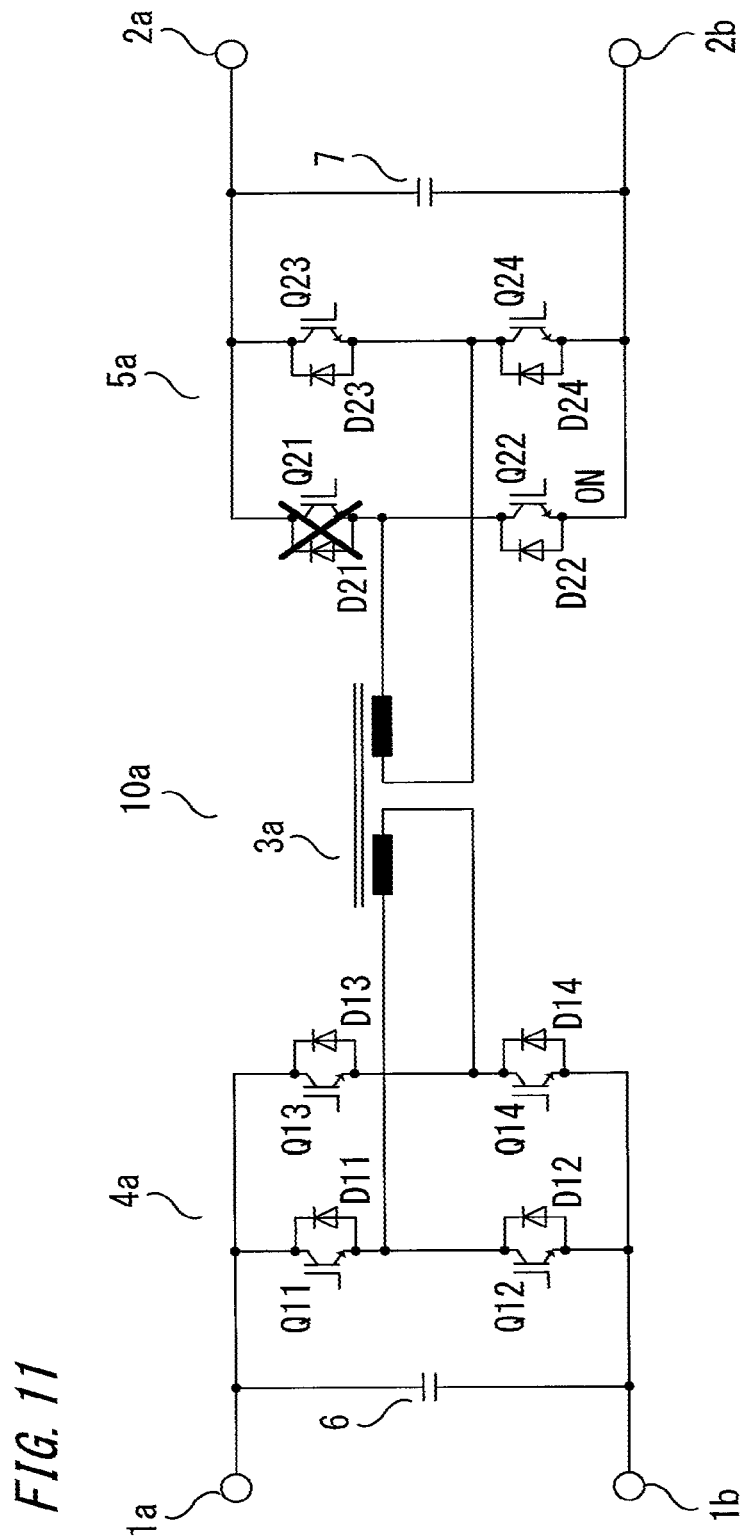
FIG. 11 is a circuit diagram illustrating a part of operation to be performed when a submodule has malfunctioned according to the second embodiment of the present invention.

When a malfunction occurs in Q21 in the second switching circuit 5a during the normal operation of the submodule 10a (FIG. 10), Q22 connected in series to Q21 is shifted to the ON state, and the malfunction detection unit 32 of the gate drive circuit 30b of Q22 detects a short-circuit current and sends the detection signal 40 to the control circuit 20a. The leg (Q21, Q22) formed of Q21, Q22 becomes a discharge leg (FIG. 11).

Figure 12:
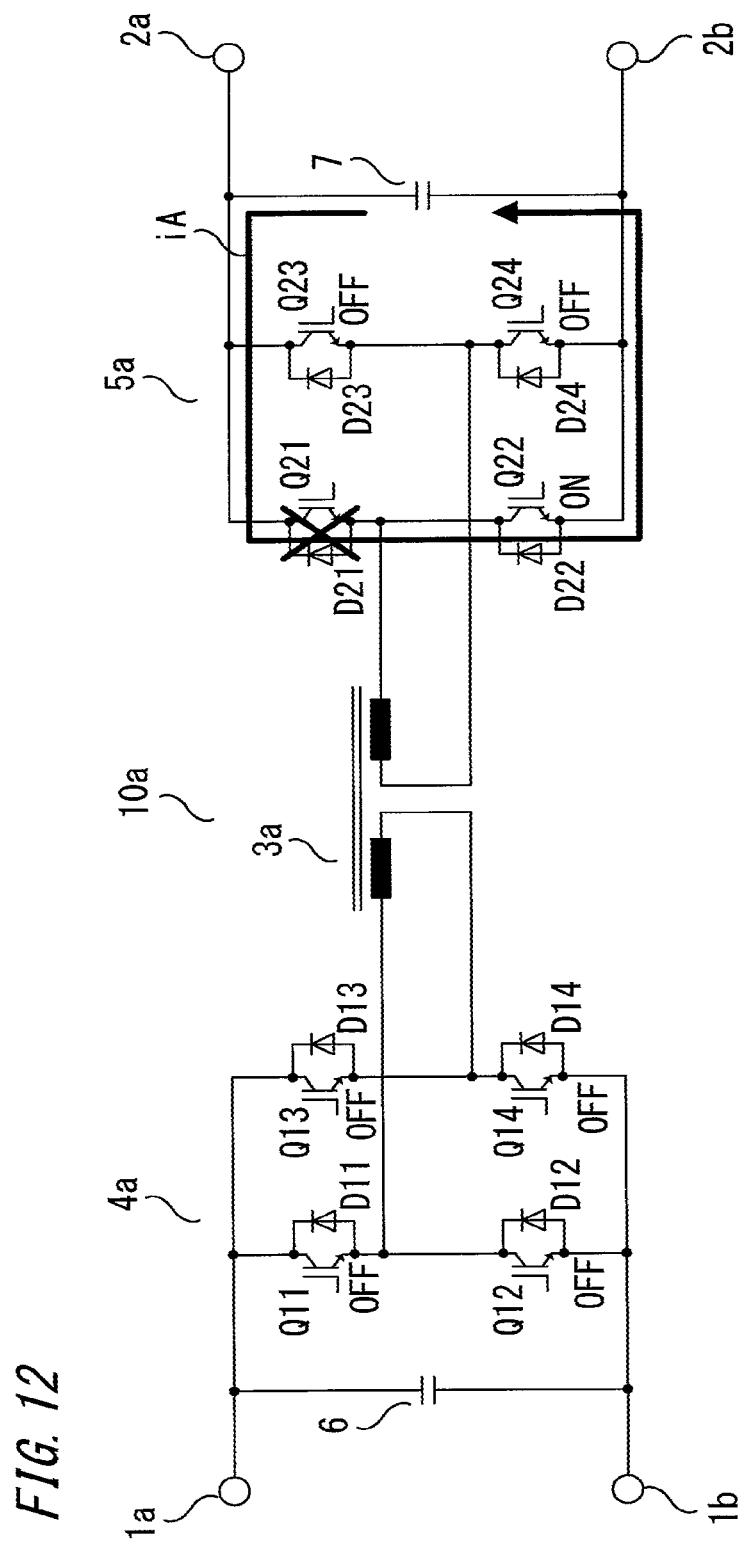
FIG. 12 is a circuit diagram illustrating a part of operation to be performed when a submodule has malfunctioned according to the second embodiment of the present invention.

The control circuit 20a receives the detection signal 40, determines that the submodule 10a has malfunctioned, controls the first switching circuit 4a by the protection mode, that is, controls all the semiconductor switching elements Q1 to the OFF states, controls the second switching circuit 5a by the discharge mode, that is, controls Q21, Q22 of the discharge leg (Q21, Q22) to the ON states, and controls the remaining semiconductor switching elements Q2 to the OFF states. As a result, the capacitor 7 is discharged through the discharge route iA passing through the discharge leg (Q21, Q22) (FIG. 12).

Figure 13:
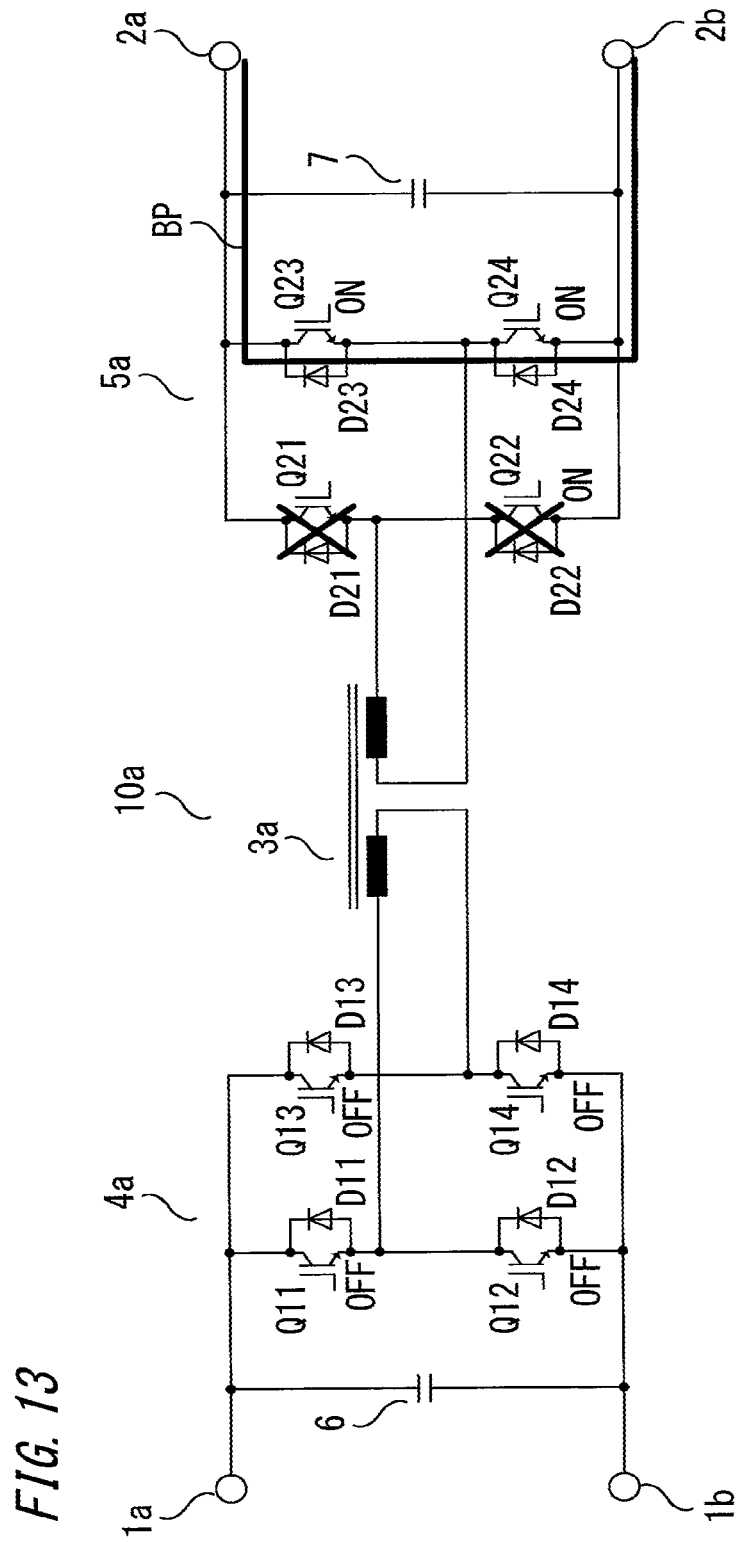
FIG. 13 is a circuit diagram illustrating a part of operation to be performed when a submodule has malfunctioned according to the second embodiment of the present invention.
Figure 14:
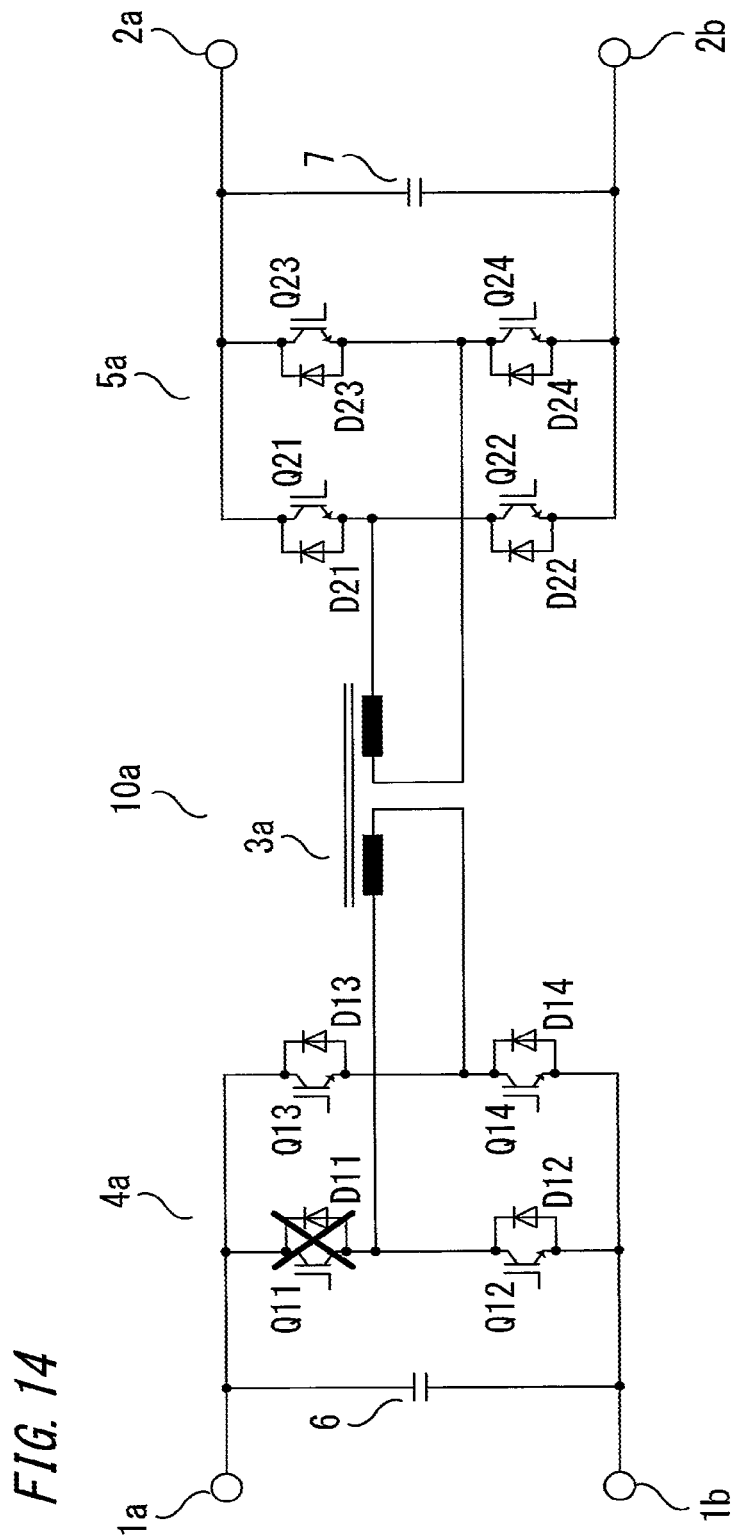
FIG. 14 is a circuit diagram showing a part of operation to be performed when a submodule has malfunctioned according to a modification of the second embodiment of the present invention.

When discharge of the capacitor 7 is completed, the control circuit 20a continues the protection mode in the first switching circuit 4a and shifts the mode to the bypass mode in the second switching circuit 5a, that is, controls Q23, Q24 of the bypass leg (Q23, Q24) to the ON states. As a result, the secondary side terminals 2a, 2b are short-circuited through the bypass route BP passing through the bypass leg (Q23, Q24) so that the capacitor 7 is bypassed (FIG. 13). It is noted that a sound leg in the second switching circuit 5, that is, a leg separate from the discharge leg is used for the bypass leg.

Next, a series of the operation to be performed when a malfunction has occurred in the semiconductor switching elements Q1 in the first switching circuit 4a included in the submodule 10a is described with reference to FIGS. 14 to 18.

Figure 15:
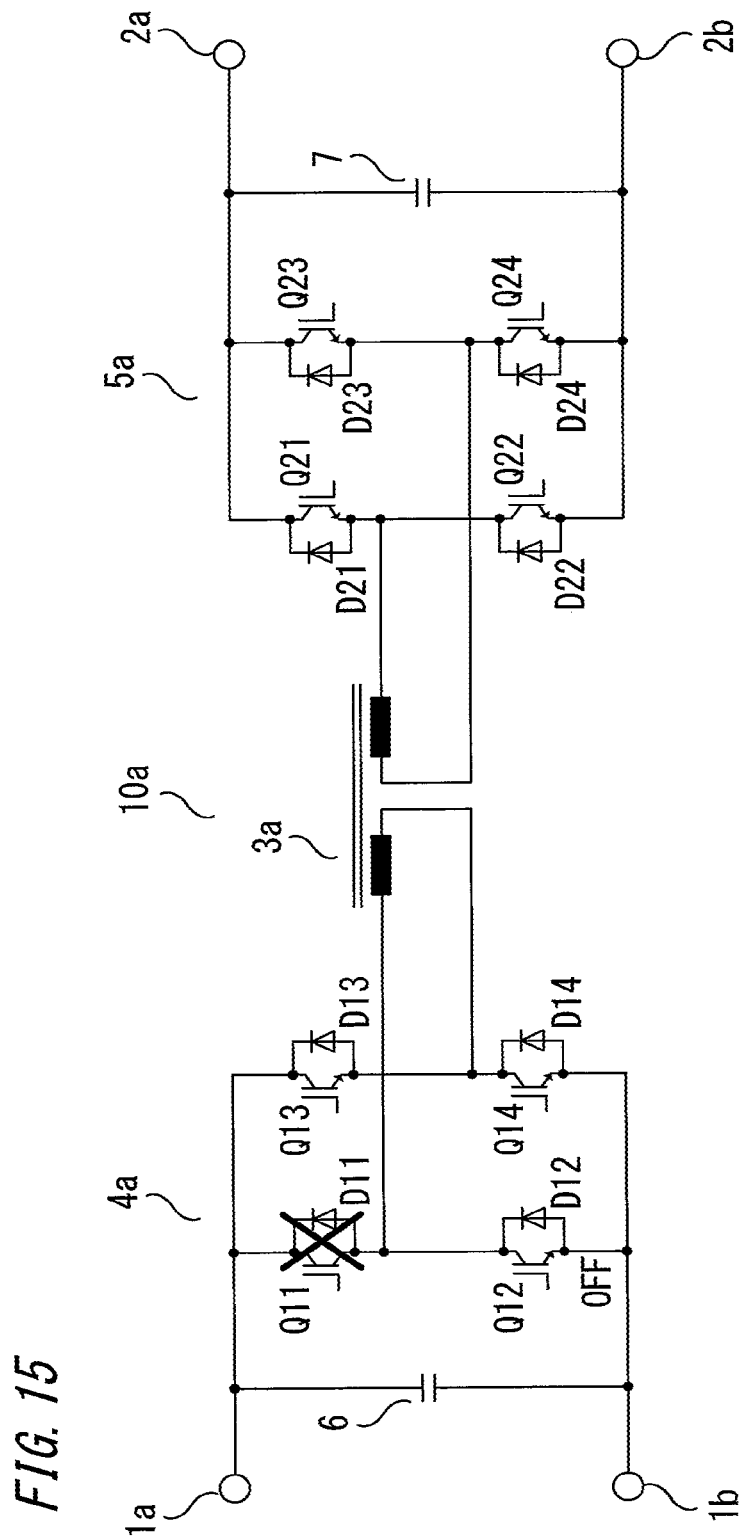
FIG. 15 is a circuit diagram showing a part of operation to be performed when a submodule has malfunctioned according to a modification of the second embodiment of the present invention.

When a malfunction occurs in Q11 in the first switching circuit 4a during the normal operation of the submodule 10a (FIG. 14), the malfunction detection unit 32 of the gate drive circuit 30a of Q12 connected in series to Q11 detects a short-circuit current and sends the detection signal 40 to the control circuit 20a, and Q12 is shifted to OFF operation (soft blocking) (FIG. 15).

Figure 16:
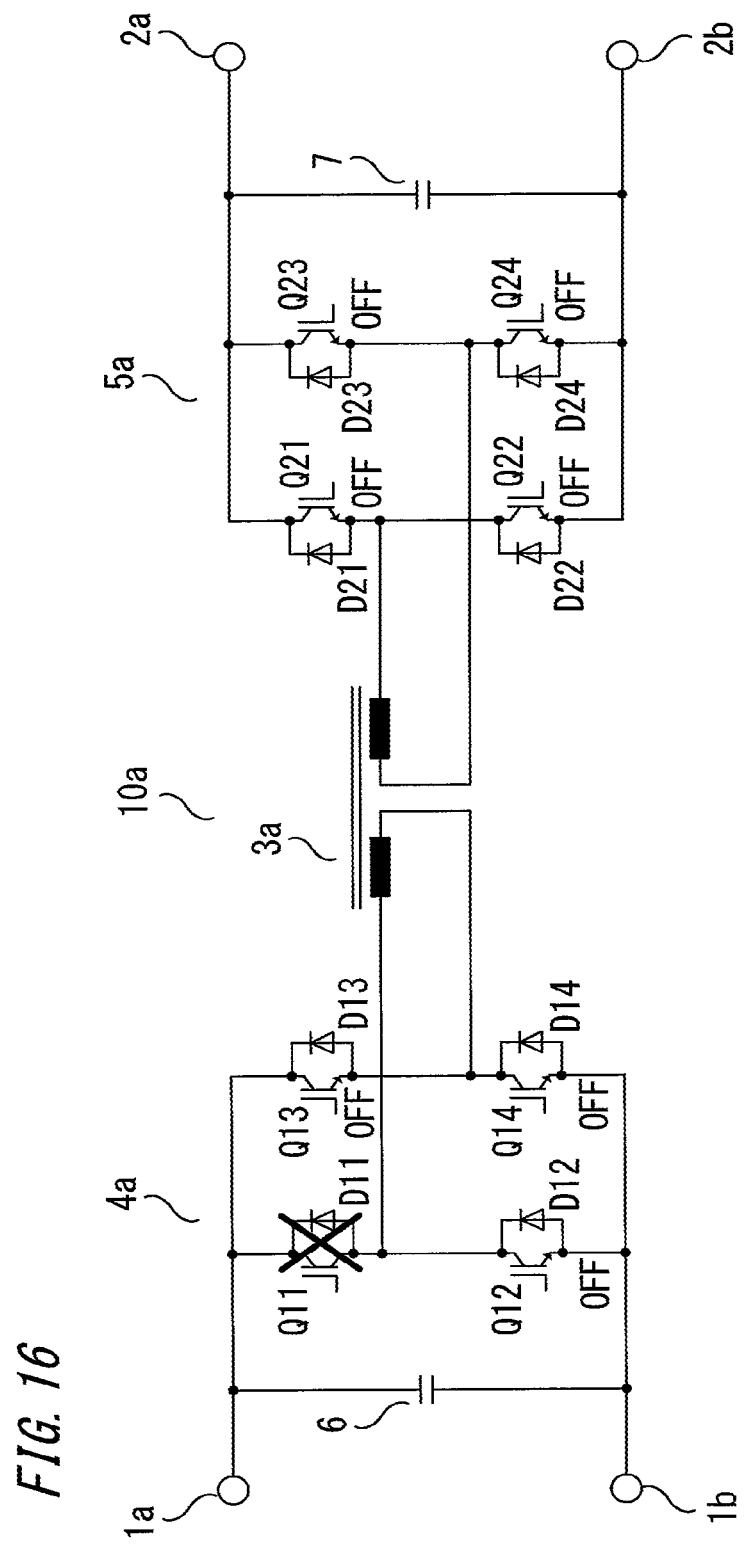
FIG. 16 is a circuit diagram showing a part of operation to be performed when a submodule has malfunctioned according to a modification of the second embodiment of the present invention.

The control circuit 20a receives the detection signal 40, determines that the submodule 10a has malfunctioned, and controls all the semiconductor switching elements Q1, Q2 to the OFF states (FIG. 16). It is noted that all the semiconductor switching elements Q1, Q2 on the primary side and the secondary side are temporarily controlled to the OFF states in this case, but this control may be omitted.

Figure 17:
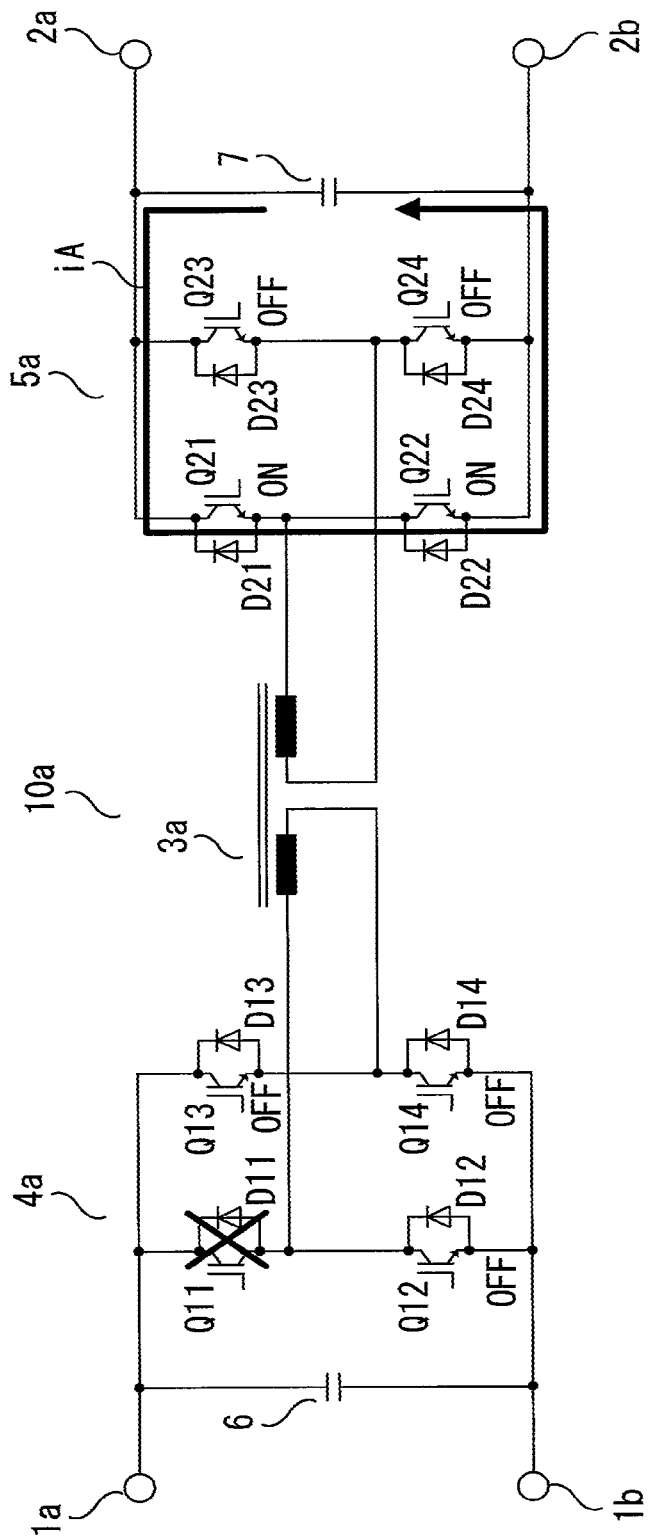
FIG. 17 is a circuit diagram showing a part of operation to be performed when a submodule has malfunctioned according to a modification of the second embodiment of the present invention.

Next, the control circuit 20a controls the first switching circuit 4a by the protection mode, that is, controls all the semiconductor switching elements Q1 to the OFF states, controls the second switching circuit 5a by the discharge mode, that is, controls Q21, Q22 of the discharge leg (Q21, Q22) to the ON states, and controls the remaining semiconductor switching elements Q2 to the OFF states. As a result, the capacitor 7 is discharged through the discharge route iA passing through the discharge leg (Q21, Q22) (FIG. 17). It is noted that any leg can be used for the discharge leg as long as the leg has no malfunction in the second switching circuit 5a.

Figure 18:
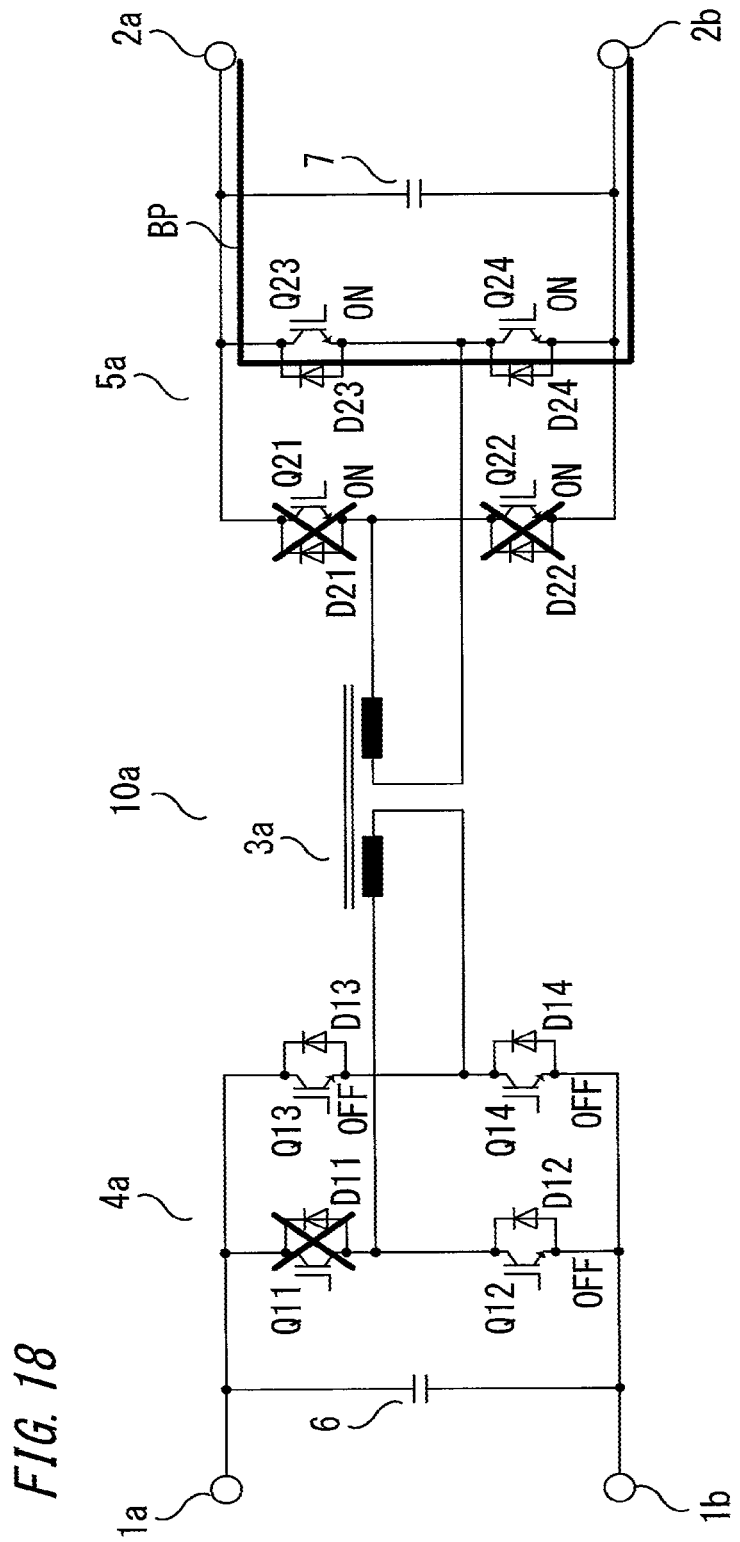
FIG. 18 is a circuit diagram showing a part of operation to be performed when a submodule has malfunctioned according to a modification of the second embodiment of the present invention.

When discharge of the capacitor 7 is completed, the control circuit 20a continues the protection mode in the first switching circuit 4a and shifts the mode to the bypass mode in the second switching circuit 5a, that is, controls Q23, Q24 of the bypass leg (Q23, Q24) to the ON states. As a result, the secondary side terminals 2a, 2b are short-circuited by the bypass route BP passing through the bypass leg (Q23, Q24) so that the capacitor 7 is bypassed (FIG. 18). It is noted that a sound leg in the second switching circuit 5a, that is, a leg separate from the discharge leg is used for the bypass leg.

As described above, also in the present embodiment, when the malfunction detection unit 32 of the gate drive circuit 30a, 30b in the submodule 10a detects a malfunction, the control circuit 20a halts the normal operation mode, controls the first switching circuit 4a by the protection mode, and controls the second switching circuit 5a by the bypass mode after controlling the second switching circuit 5a by the discharge mode. Accordingly, control to reliably disconnect the input and output of the submodule 10a from the entire power conversion device 100 so as to bypass the input and output, can be performed. Thus, the operation of the power conversion device 100 can be continued with use of the remaining sound submodules 10a.

It is noted that, also in the present embodiment, when a submodule 10a malfunctions, the remaining sound submodules 10a operate so as to compensate for the output voltage or transmission power of the malfunctioning submodule 10a as in the above first embodiment. Accordingly, a desired operation of the power conversion device 100 can be continued.

Third Embodiment

Next, the third embodiment of the present invention is described.

In the third embodiment, each submodule includes a bypass switch for bypassing the secondary side capacitor 7 by causing a short circuit between the secondary side terminals 2a, 2b.

Figure 19:
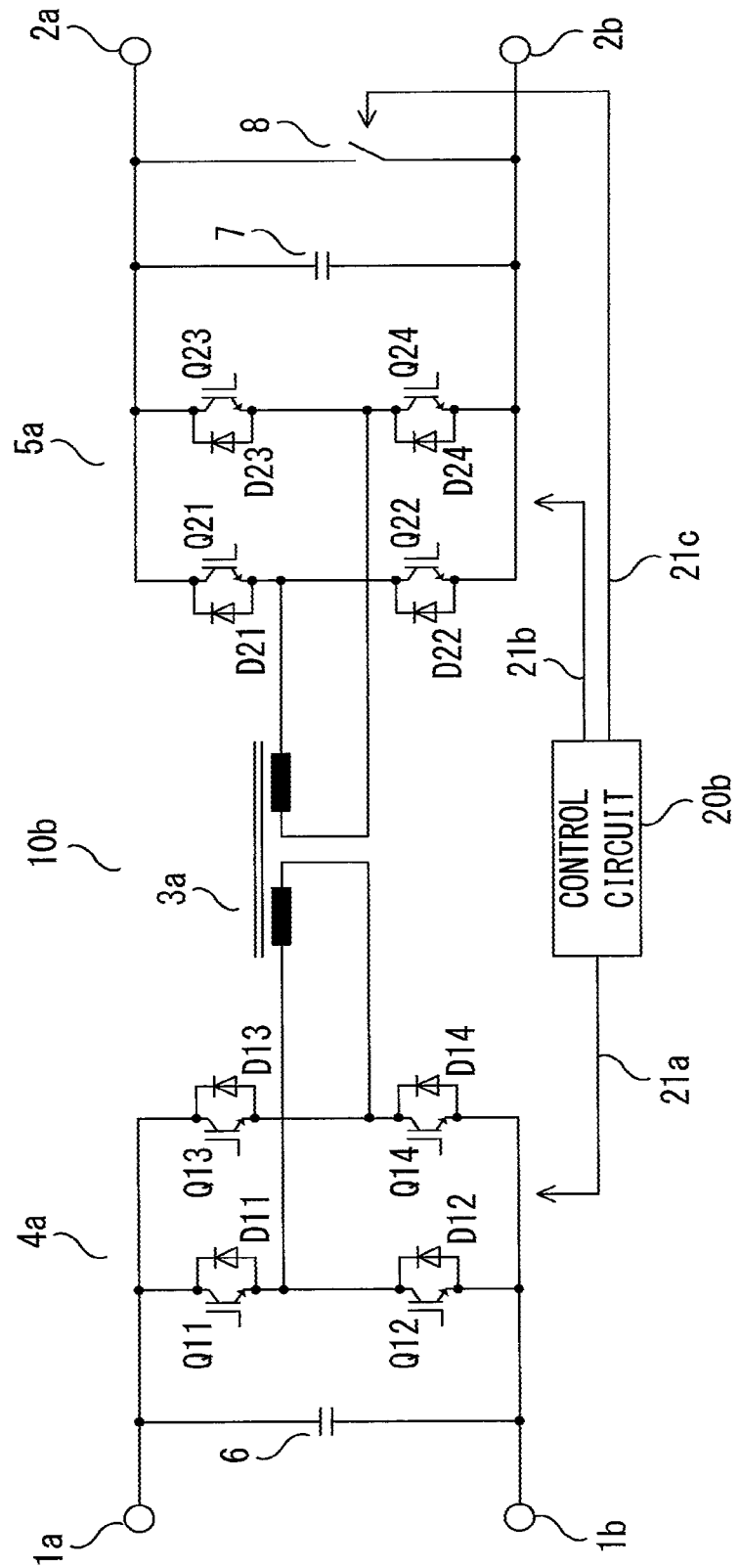
FIG. 19 is a circuit diagram showing the configuration of a submodule according to a third embodiment of the present invention.
Figure 20:
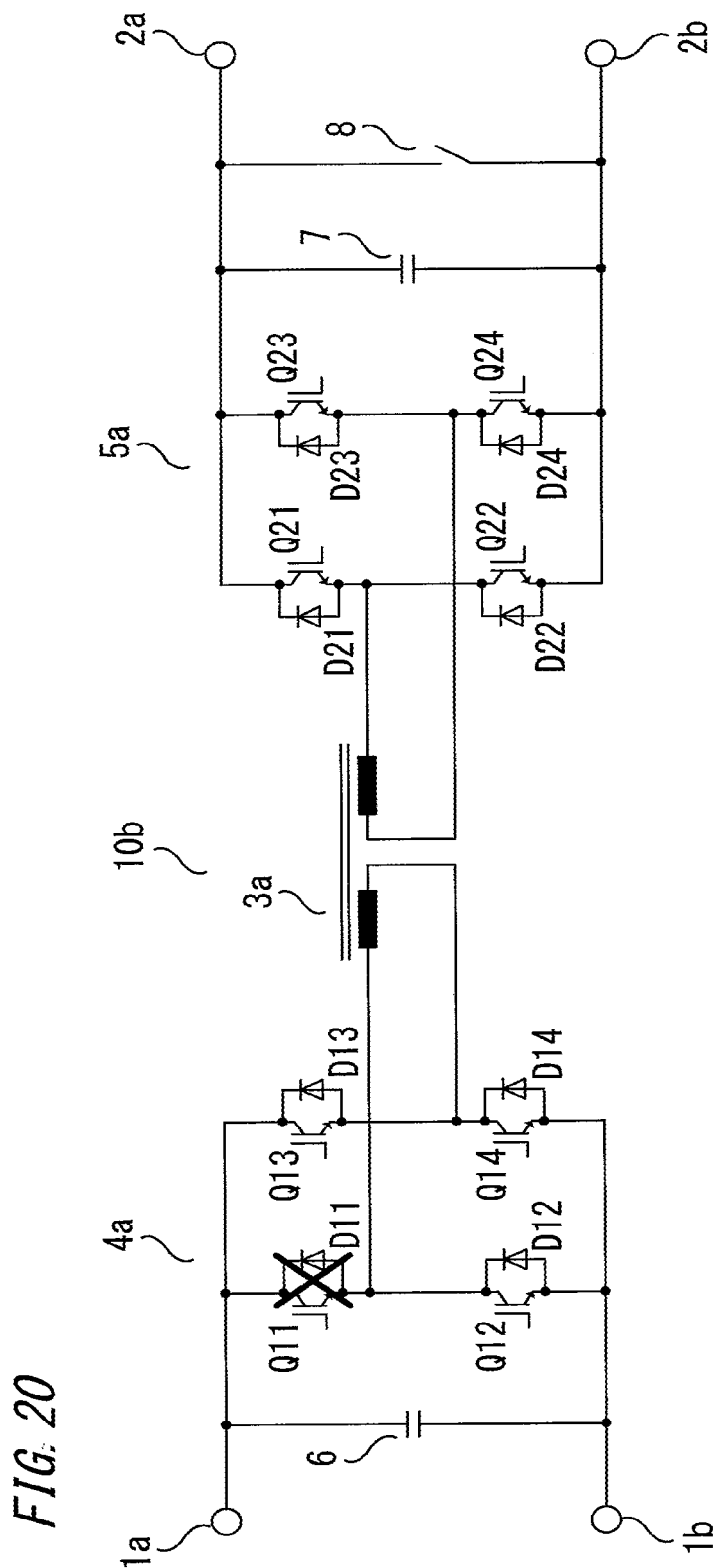
FIG. 20 is a circuit diagram showing a part of operation to be performed when a submodule has malfunctioned according to the third embodiment of the present invention.

FIG. 19 is a circuit diagram showing the detailed configuration of a submodule 10b in the power conversion device 100 of the third embodiment.

As shown in FIG. 19, each of the submodules 10b includes the transformer 3a, the first and second switching circuits 4a, 5a, and the capacitor 6 and 7 the same as those of the above second embodiment, and further includes a bypass switch 8 connected in parallel to the secondary side capacitor 7. For the bypass switch 8, a mechanical switch which is latched on the conductive state is used.

Each of the submodules 10b further includes a control circuit 20b. The control circuit 20b generates the drive signals 21a, 21b to control the first switching circuit 4a and the second switching circuit 5a, and generates a control signal 21c to control the conductive state of the bypass switch 8.

The other components are the same as those of the above second embodiment.

Hereinafter, when the submodule 10b is illustrated, illustration of the control circuit 20b is omitted for convenience, unless otherwise required.

In addition to the normal operation mode, the control circuit 20b is provided with, as control modes for an abnormal time when a malfunction has been detected, a protection mode for turning OFF all the semiconductor switching elements Q1 in the first switching circuit 4a, a discharge mode for discharging the capacitor 7 by turning ON the semiconductor switching elements Q2 of a predetermined leg in the second switching circuit 5a, and a bypass mode for causing a short circuit between the secondary side terminals 2a, 2b so as to bypass the capacitor 7, as in the above second embodiment. In this case, in the bypass mode, the bypass switch 8 is controlled to the conductive state and a short circuit between the secondary side terminals 2a, 2b is caused via the bypass switch 8 so that the capacitor 7 is bypassed.

Next, a series of the operation to be performed when a malfunction has occurred in the semiconductor switching elements Q1 in the first switching circuit 4a included in the submodule 10b is described with reference to FIGS. 20 to 24.

Figure 21:
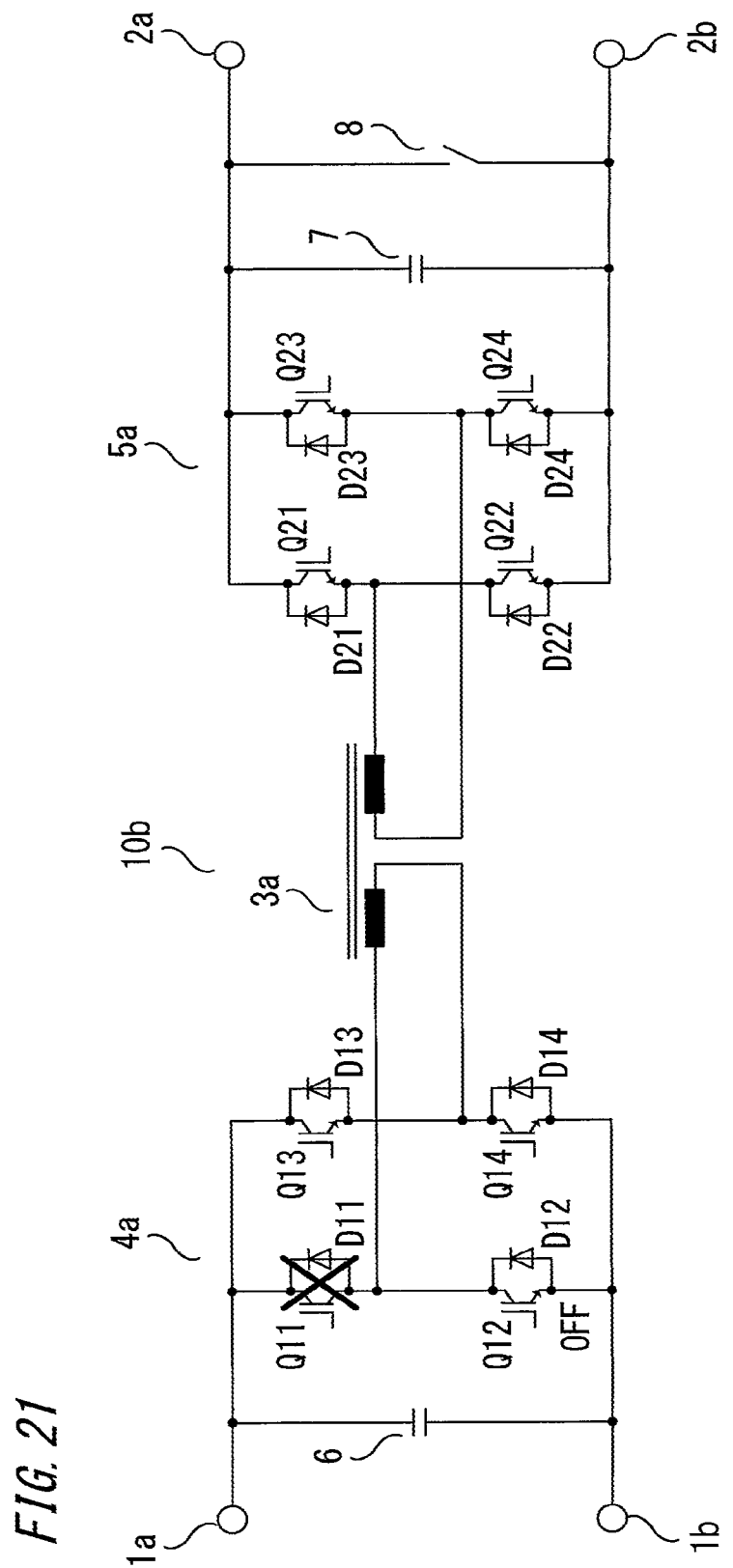
FIG. 21 is a circuit diagram showing a part of operation to be performed when a submodule has malfunctioned according to the third embodiment of the present invention.

When a malfunction occurs in Q11 in the first switching circuit 4a during the normal operation of the submodule 10b (FIG. 20), the malfunction detection unit 32 of the gate drive circuit 30a of 012 connected in series to Q11 detects a short-circuit current and sends the detection signal 40 to the control circuit 20b, and 012 is shifted to OFF operation (soft blocking) (FIG. 21).

Figure 22:
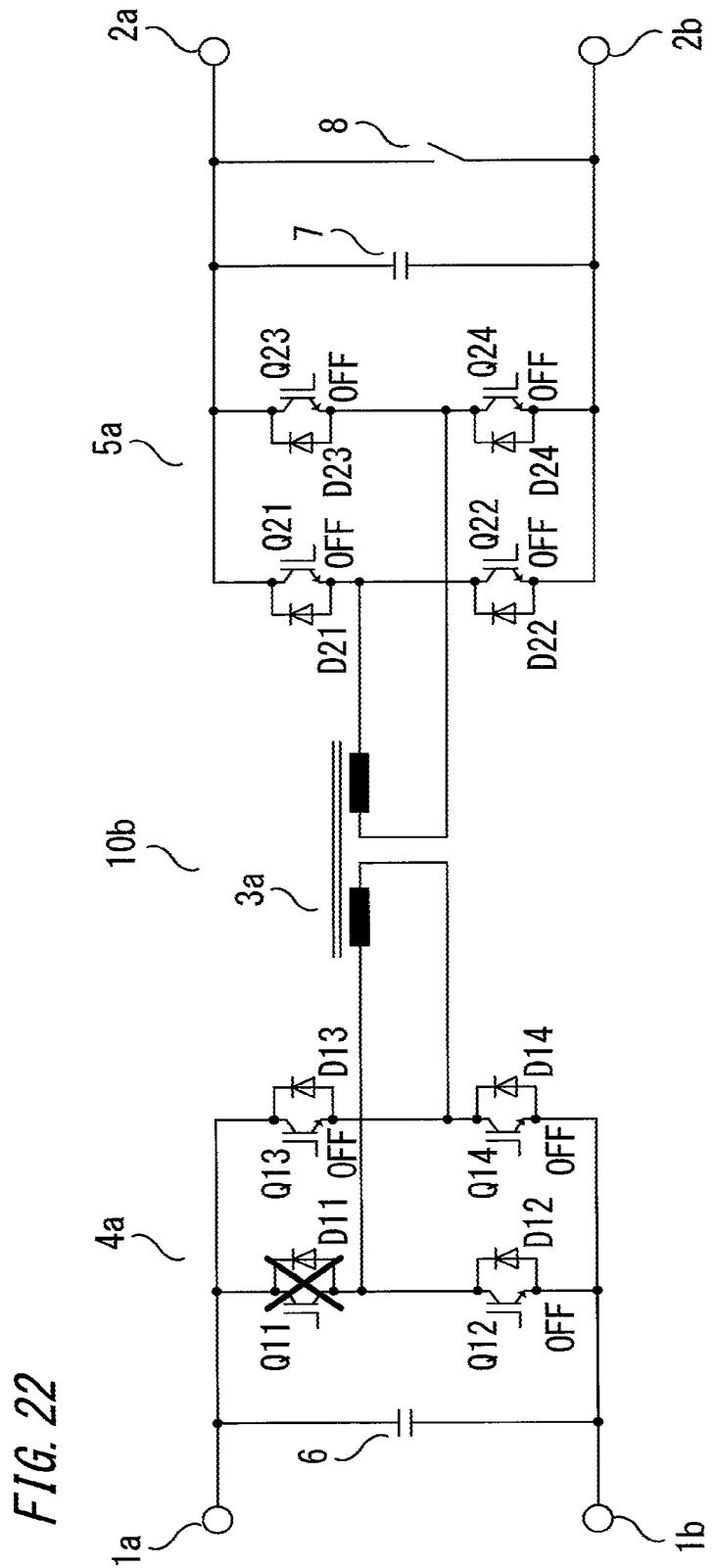
FIG. 22 is a circuit diagram showing a part of operation to be performed when a submodule has malfunctioned according to the third embodiment of the present invention.

The control circuit 20b receives the detection signal 40, determines that the submodule 10b has malfunctioned, and controls all the semiconductor switching elements Q1, Q2 to the OFF states (FIG. 22). It is noted that all the semiconductor switching elements Q1, Q2 on the primary side and the secondary side are temporarily controlled to the OFF states in this case, but this control may be omitted.

Figure 23:
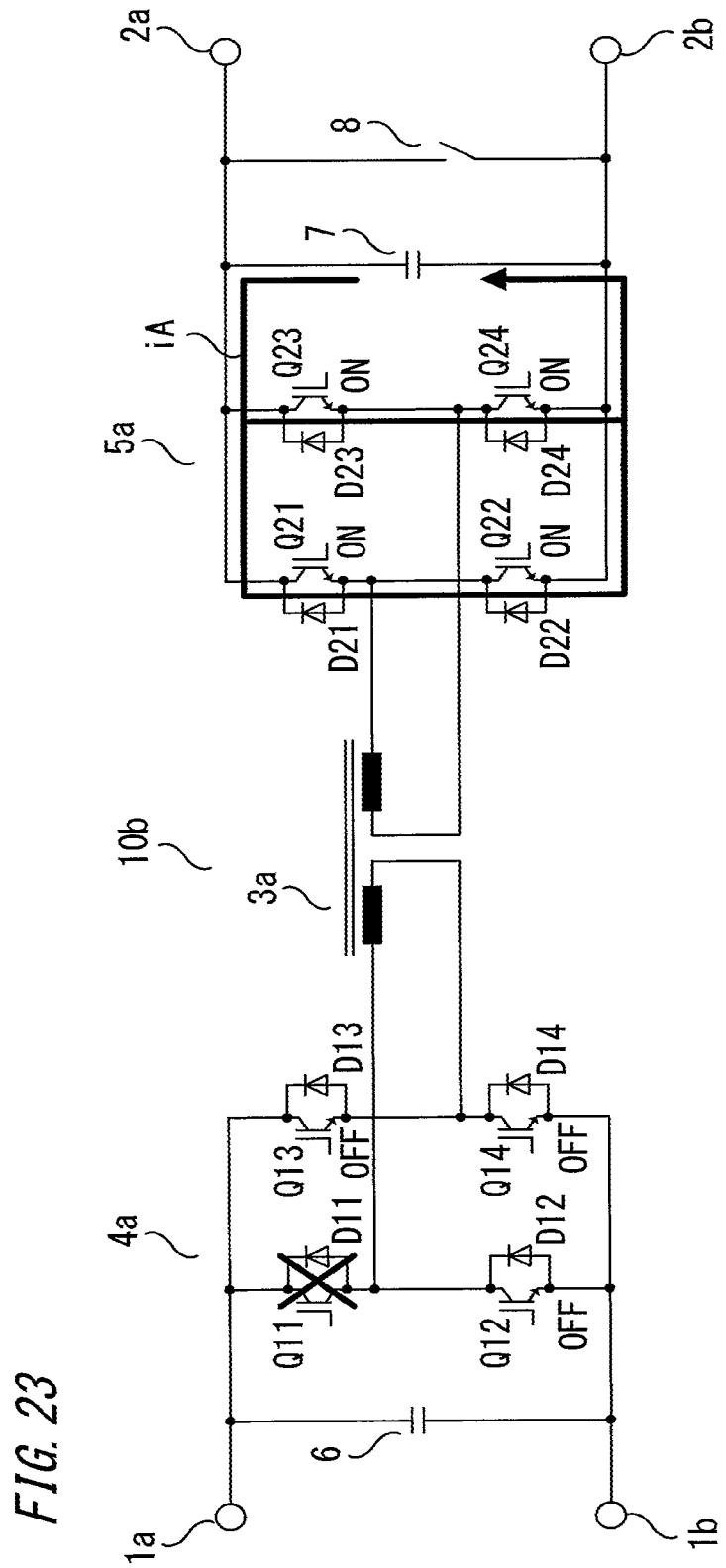
FIG. 23 is a circuit diagram showing a part of operation to be performed when a submodule has malfunctioned according to the third embodiment of the present invention.

Next, the control circuit 20b controls the first switching circuit 4a by the protection mode, that is, controls all the semiconductor switching elements Q1 to the OFF states, controls the second switching circuit 5a by the discharge mode, that is, controls the semiconductor switching elements Q2 of the discharge leg to the ON states. In this case, the semiconductor switching elements Q2 are controlled to the ON states while all the legs (in this case, two legs) in the second switching circuit 5a serve as discharge legs. As a result, the capacitor 7 is discharged through the discharge route iA passing through the two discharge legs (Q21, Q22), (Q23, Q24) (FIG. 23).

Figure 24:
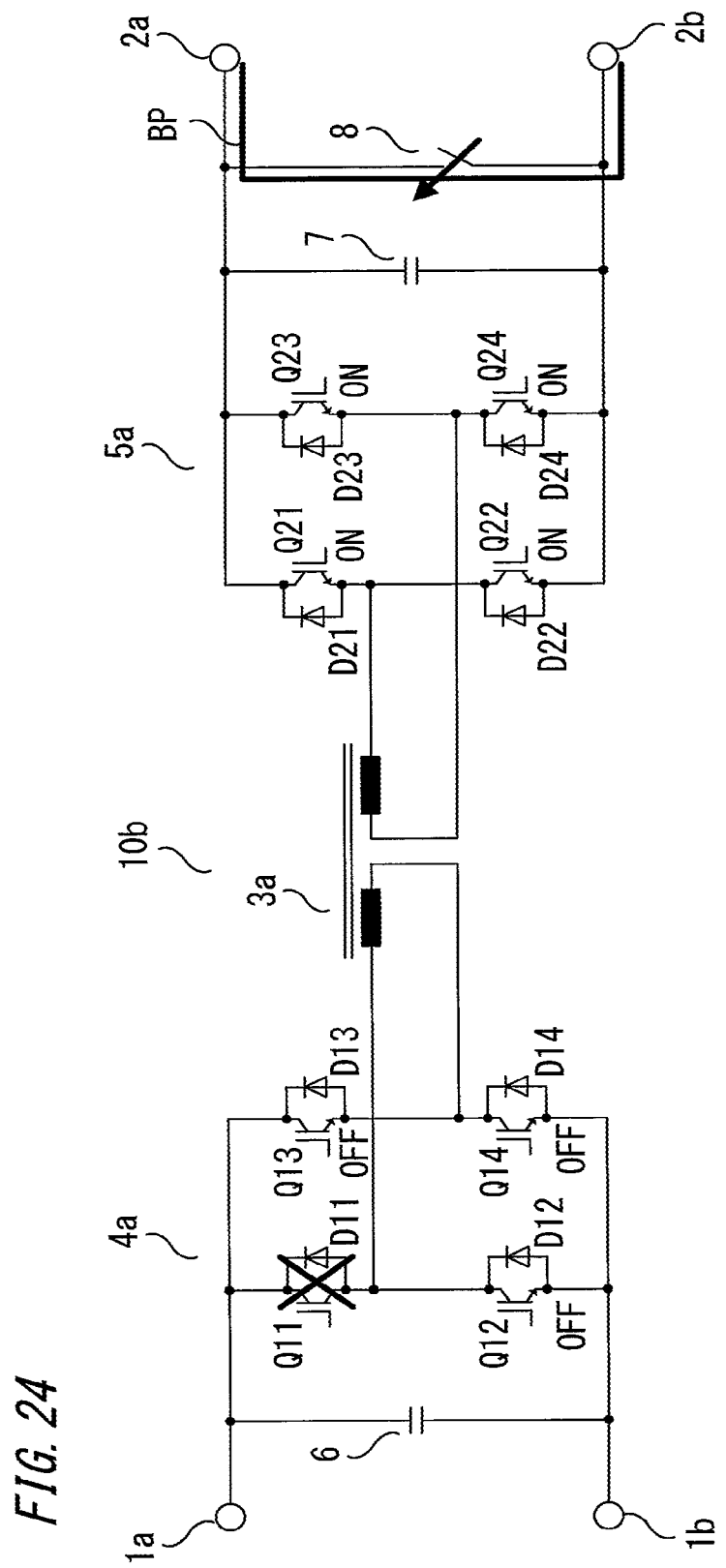
FIG. 24 is a circuit diagram showing a part of operation to be performed when a submodule has malfunctioned according to the third embodiment of the present invention.

When discharge of the capacitor 7 is completed, the control circuit 20b continues the protection mode in the first switching circuit 4a and shifts the mode to the bypass mode in the second switching circuit 5a, that is, controls the bypass switch 8 to the conductive state. As a result, the secondary side terminals 2a, 2b are short-circuited through the bypass route BP passing through the bypass switch 8 so that the capacitor 7 is bypassed (FIG. 24).

As described above, also in the present embodiment, when the malfunction detection unit 32 of the gate drive circuit 30a, 30b in the submodule 10b detects a malfunction in the semiconductor switching elements Q1, Q2, the control circuit 20b halts the normal operation mode, controls the first switching circuit 4a by the protection mode, and controls the second switching circuit 5a by the bypass mode after controlling the second switching circuit 5 by the discharge mode. Accordingly, control to reliably disconnect the input and output of the submodule 10b from the entire power conversion device 100 so as to bypass the input and output, can be performed. Thus, the operation of the power conversion device 100 can be continued with use of the remaining sound submodules 10b.

Further, in the present embodiment, the bypass switch 8 is provided, and the secondary side terminals 2a, 2b are short-circuited through the bypass route BP passing through the bypass switch 8 during the control by the bypass mode. Since a mechanical switch which is latched on the conductive state, for example, is used for the bypass switch 8, no continuous power supply is required. Accordingly, unlike the above first and second embodiments using the bypass leg formed of the semiconductor switching elements Q2, no continuous power supply to the gate drive circuit 30b after a malfunction is required, and thus, the more reliable power conversion device 100 can be implemented.

In addition, since the capacitor 7 is bypassed by the bypass switch 8, all the legs in the second switching circuit 5a can be used as discharge legs during the control by the discharge mode. Since the capacitor 7 is discharged via a plurality of discharge legs in this way, the power load on the semiconductor switching elements Q2 is reduced, whereby the explosion resistances of the semiconductor switching elements Q2 can be reduced.

It is noted that, also in the present embodiment, when a submodule 10b malfunctions, the remaining sound submodules 10b operate so as to compensate for the output voltage or transmission power of the malfunctioning submodule 10b, as in the above first and second embodiments. Accordingly, a desired operation of the power conversion device 100 can be continued.

Figure 25:
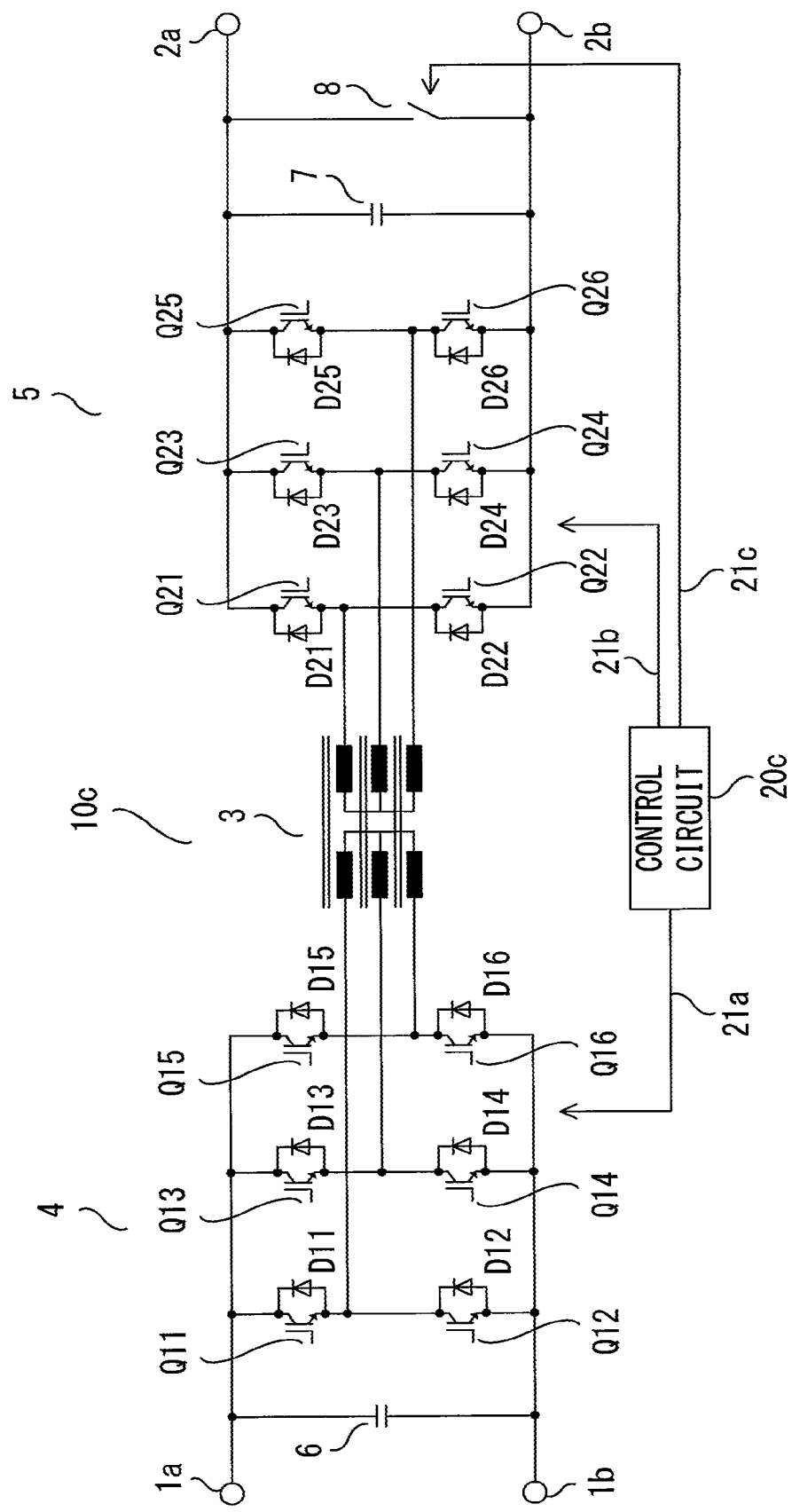
FIG. 25 is a circuit diagram showing the configuration of a submodule according to a modification of the third embodiment of the present invention.

In addition, the bypass switch 8 is also applicable to the submodule 10 described in the above first embodiment. FIG. 25 is a circuit diagram showing the detailed configuration of a submodule 10c according to a modification of the third embodiment. The submodule 10c includes the transformer 3, the first and second switching circuits 4, 5, and the capacitors 6, 7, the same as those of the above first embodiment, and further includes the bypass switch 8 connected in parallel to the secondary side capacitor 7. Moreover, the submodule 10c further includes a control circuit 20c. The control circuit 20c generates the drive signals 21a, 21b to control the first switching circuit 4 and the second switching circuit 5, and generates the control signal 21c to control the conductive state of the bypass switch 8.

Also in this case, the same effect as in the above third embodiment can be provided.

Fourth Embodiment

Figure 26:
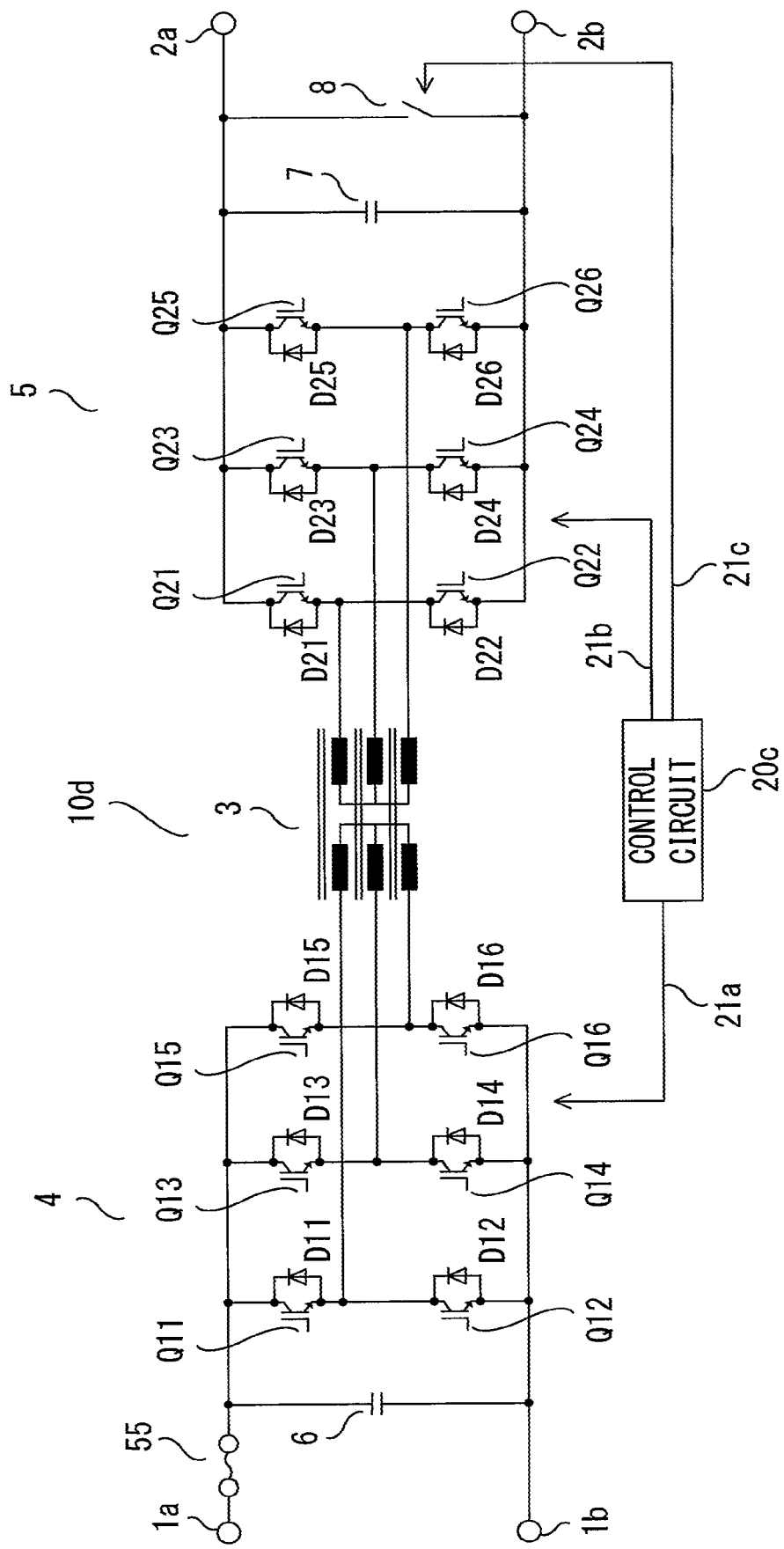
FIG. 26 is a circuit diagram showing the configuration of a submodule according to the fourth embodiment of the present invention.

Next, the fourth embodiment of the present invention is described. FIG. 26 is a circuit diagram showing the detailed configuration of a submodule 10d in the power conversion device 100 of the fourth embodiment. Since the fourth embodiment is similar to the third embodiment described above, the difference of the fourth embodiment from the third embodiment is mainly described below.

The fourth embodiment includes an open path unit 55 between the first switching circuit 4 and the primary side terminal 1a. Specifically, as shown in FIG. 26, the open path unit 55 is connected between the capacitor 6 and the primary side terminal 1a. A configuration using a fuse for the open path unit 55 is shown in FIG. 26. However, a configuration using a breaker may be used. The open path unit 55 is provided on at least one of the two primary side terminals 1a, 1b.

In each of the first to third embodiments described above, when any one of the semiconductor switching elements Q1 in the first switching circuit 4 has malfunctioned, the sound semiconductor switching elements Q1 are turned OFF through the arm short circuit protection before malfunctioning, whereby the sound semiconductor switching elements Q1 are protected from an overcurrent. As a result, a short-circuited state is eliminated. However, when two or more of the semiconductor switching elements Q1 in the first switching circuit 4 simultaneously malfunction, and when the arm short circuit fails to function, a short-circuited state of the capacitor 6 cannot be eliminated.

In the fourth embodiment, the open path unit 55 for cutting off a current when an overcurrent occurs is provided between the capacitor 6 and the primary side terminal 1a. As a result of provision of the open path unit 55, the first switching circuit 4 is disconnected from the primary side terminals 1a, 1b at the time of occurrence of an overcurrent. Consequently, when two or more of the semiconductor switching elements Q1 of the first switching circuit 4 simultaneously malfunction and when the arm short circuit fails to function, a short-circuited state in which an overcurrent flows can be reliably eliminated.

Although the fourth embodiment is similar to the third embodiment, the configuration of the open path unit 55 is applicable to each of the first embodiment and the second embodiment. Also in this case, the same effect as in the fourth embodiment can be provided.

Figure 27:
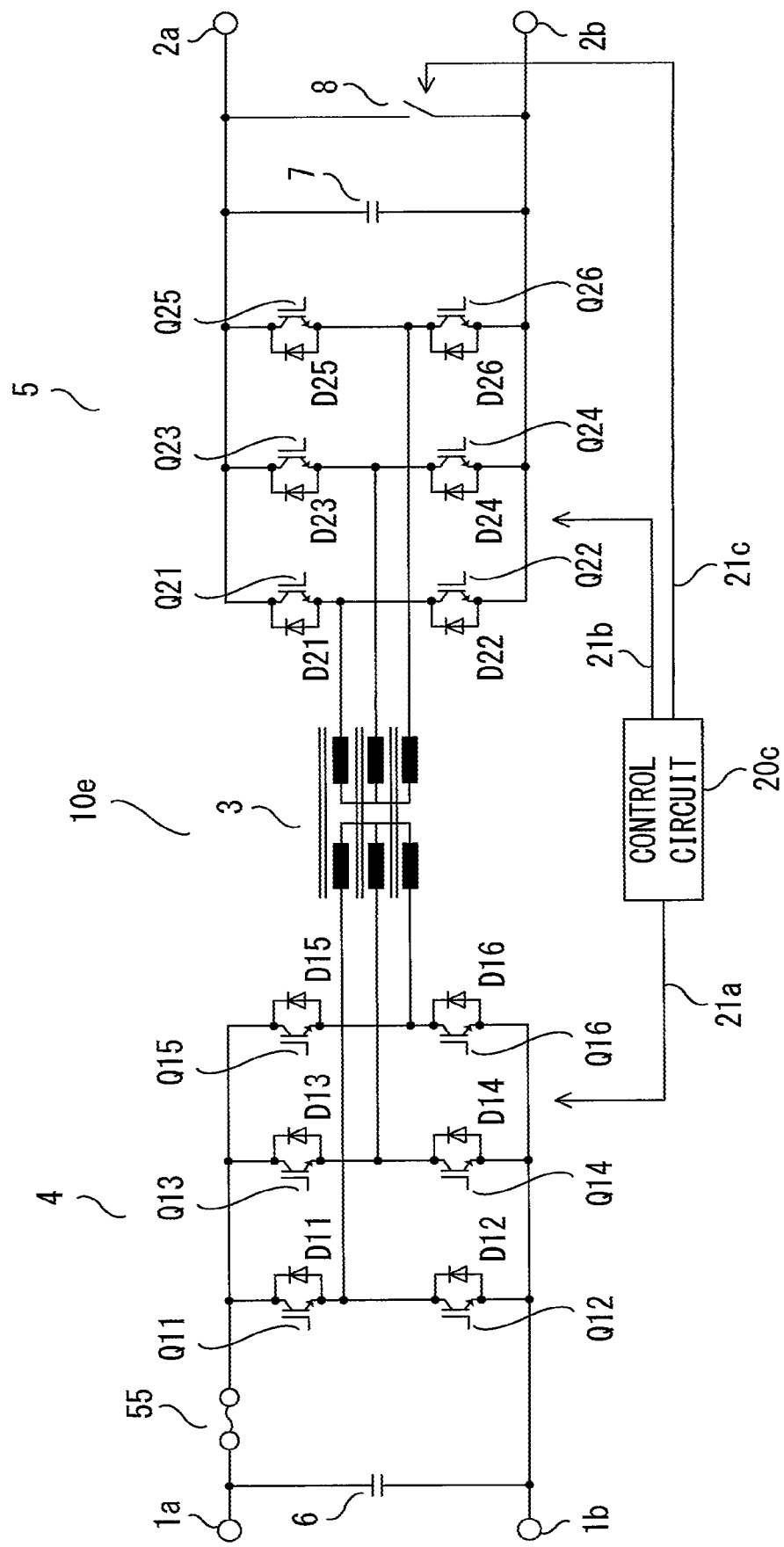
FIG. 27 is a circuit diagram showing the configuration of a submodule according to a modification of the fourth embodiment of the present invention.

FIG. 27 is a circuit showing the detailed configuration of a submodule 10e in the power conversion device 100 according to a modification of the fourth embodiment of the present invention. As shown in FIG. 27, the open path unit 55 may be connected between the first switching circuit 4 and the capacitor 6. Further, in the fourth embodiment, the first switching circuit 4 has been described as a three-phase bridge circuit. However, single-phase full-bridge circuits may be used for the submodules 10d, 10e as in the second embodiment. Moreover, the fourth embodiment has the configuration including the bypass switch 8. However, the configuration that does not include the bypass switch 8 as in the first embodiment may be used. When single-phase full-bridge circuits are used, or when the configuration from the second switching circuit 5 to the secondary side terminals 2a, 2b are the same as that of the first embodiment, provision of the open path unit 55 provides the same effect as in the fourth embodiment.

It is noted that, within the scope of the present invention, the above embodiments may be freely combined with each other, or each of the above embodiments may be modified or simplified as appropriate.

The invention claimed is:

1. A power conversion device including a plurality of DC/DC converters, primary side terminals of which are connected in parallel and secondary side terminals of which are connected in series, the DC/DC converters each comprising:
    a transformer;
    a first switching circuit formed of a bridge circuit including a plurality of legs having a plurality of semiconductor switching elements to which antiparallel diodes are respectively connected, the first switching circuit being connected between the primary side terminals and a primary winding of the transformer so as to perform DC/AC power conversion;

a second switching circuit formed of a bridge circuit including a plurality of legs having a plurality of semiconductor switching elements to which antiparallel diodes are respectively connected, the second switching circuit being connected between the secondary side terminals and a secondary winding of the transformer so as to perform AC/DC power conversion;

a capacitor connected in parallel to the secondary side terminals; and a control circuit for controlling the first switching circuit and the second switching circuit, wherein a gate drive circuit of at least one of the semiconductor switching elements in each of the legs of the first switching circuit and the second switching circuit, includes a malfunction detection circuit for detecting a malfunction in the semiconductor switching element, the control circuit is provided with a normal operation mode, a protection mode for turning OFF all the semiconductor switching elements in the first switching circuit, a discharge mode for discharging the capacitor by turning ON the semiconductor switching elements in a predetermined leg in the second switching circuit, and a bypass mode for bypassing the capacitor by causing a short circuit between the secondary side terminals, and in each of the DC/DC converters, when the malfunction detection circuit detects the malfunction in the semiconductor switching element, the control circuit halts the normal operation mode, controls the first switching circuit by the protection mode, and controls the second switching circuit by the bypass mode after controlling the second switching circuit by the discharge mode.

2. The power conversion device according to claim 1, wherein in the bypass mode, the control circuit causes a short circuit between the secondary side terminals by turning ON the semiconductor switching elements in a leg separate from the predetermined leg used in the discharge mode in the second switching circuit.

3. The power conversion device according to claim 2, wherein in the bypass mode, the leg which is used in the second switching circuit is a sound leg that does not include the semiconductor switching element where the malfunction has been detected, and all the semiconductor switching elements in the leg are ON.

4. The power conversion device according to claim 3, wherein in the discharge mode, the predetermined leg which is used in the second switching circuit includes the semiconductor switching element where the malfunction has been detected, and the remaining semiconductor switching elements in the predetermined leg are ON.

5. The power conversion device according to claim 2, wherein in the discharge mode, the predetermined leg which is used in the second switching circuit includes the semiconductor switching element where the malfunction has been detected, and the remaining semiconductor switching elements in the predetermined leg are ON.

6. The power conversion device according to claim 2, wherein the malfunction detection circuit detects, as the malfunction, a short circuit of two arms in the leg.

7. The power conversion device according to claim 2, wherein in the protection mode, all the semiconductor switching elements in the first switching circuit excluding the semiconductor switching element where the malfunction has been detected are OFF.

8. The power conversion device according to claim 2, wherein the control circuit executes shift to the bypass mode after discharge of the capacitor in the discharge mode is completed.

9. The power conversion device according to claim 1, wherein each of the DC/DC converters includes a bypass switch connected in parallel to the capacitor, and in the bypass mode, the control circuit causes a short circuit between the secondary side terminals by controlling the bypass switch to a conductive state.

10. The power conversion device according to claim 9, wherein in the discharge mode, all the legs in the second switching circuit serve as the predetermined legs.

11. The power conversion device according to claim 1, wherein in the discharge mode, the predetermined leg which is used in the second switching circuit includes the semiconductor switching element where the malfunction has been detected, and the remaining semiconductor switching elements in the predetermined leg are ON.

12. The power conversion device according to claim 1, wherein the malfunction detection circuit detects, as the malfunction, a short circuit of two arms in the leg.

13. The power conversion device according to claim 12, wherein in the first switching circuit, the gate drive circuit including the malfunction detection circuit, includes a blocking circuit for blocking the semiconductor switching element.

14. The power conversion device according to claim 1, wherein in the protection mode, all the semiconductor switching elements in the first switching circuit excluding the semiconductor switching element where the malfunction has been detected are OFF.

15. The power conversion device according to claim 1, wherein the control circuit executes shift to the bypass mode after discharge of the capacitor in the discharge mode is completed.

16. The power conversion device according to claim 1, wherein the semiconductor switching elements in the second switching circuit are provided with an explosion proof structure.

17. The power conversion device according to claim 1, wherein the control circuit of each of the plurality of DC/DC converters increases terminal voltages at the secondary side terminals of the DC/DC converter when the malfunction is detected in another one of the DC/DC converters such that reduction of the entire output voltage is compensated for.

18. The power conversion device according to claim 1, wherein the control circuit in each of the plurality of DC/DC converters increases transmission power of the DC/DC converter when the malfunction is detected in another one of the DC/DC converters such that reduction of the entire transmission power is compensated for.

19. The power conversion device according to claim 1, wherein
an open path circuit for cutting off a current when an overcurrent flows, is provided between the first switching circuit and the primary side terminals.

20. The power conversion device according to claim 19, wherein
the open path circuit is formed of a fuse.

* * * * *